United States Patent
Azaria

(10) Patent No.: US 12,099,615 B1
(45) Date of Patent: Sep. 24, 2024

(54) CONTAINER IMAGE DEDUPLICATION FOR VULNERABILITY DETECTION AND MANAGEMENT IN IT SYSTEMS

(71) Applicant: Nucleus Security, Inc., Sarasota, FL (US)

(72) Inventor: Gil Azaria, Melbourne (AU)

(73) Assignee: Nucleus Security, Inc., Sarasota, FL (US)

( * ) Notice: Subject to any disclaimer, the term of this patent is extended or adjusted under 35 U.S.C. 154(b) by 0 days.

(21) Appl. No.: 18/430,355

(22) Filed: Feb. 1, 2024

(51) Int. Cl.
G06F 21/57 (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| | | | | |
|---|---|---|---|---|
| 11,886,403 B1* | 1/2024 | Serena | ................ | G06F 16/2365 |
| 11,977,536 B2* | 5/2024 | Gonzalez Macias | ..... | G06F 7/08 |
| 2021/0365344 A1* | 11/2021 | Bui | .......................... | G06F 17/18 |
| 2021/0382997 A1* | 12/2021 | Yi | .......................... | G06F 21/577 |
| 2023/0376604 A1* | 11/2023 | Weizman | .............. | G06F 21/577 |
| 2024/0111873 A1* | 4/2024 | Fleming | ................ | G06F 21/577 |
| 2024/0176888 A1* | 5/2024 | Sahar-Kaneti | ........ | G06F 21/577 |

* cited by examiner

*Primary Examiner* — Meng Li
(74) *Attorney, Agent, or Firm* — Scale LLP

(57) ABSTRACT

Disclosed are methods, systems and non-transitory computer readable memory for container image or host deduplication in vulnerability management systems. For instance, a method may include: obtaining source data from at least one source, wherein the source data includes a plurality of assets and/or findings; extracting data bits for each asset or finding from the source data; determining a first asset or finding concerns a first container image or first host based on the data bits for the first asset or finding; in response to determining the first asset or finding concerns the first container image or first host, obtaining a container image dataset or a search structure; determining whether the data bits match any of the plurality of sets of values of the container image dataset or the search structure; and, based on a match result, generating or updating records for the first container image or the first host.

20 Claims, 24 Drawing Sheets

Finding Processing (11) Ticketing & Issue Tracking (5) Notifications (0) Asset Removal (1) Asset Ignore (1)

| Action | Action |
|---|---|
| Asset IP is not 192.168.1.0/24 | Asset Group: /Network Location/External<br>Public: Yes |
| | Asset Group: /Scotts Group/{{asset.metadata.cxsast.team}} |
| | Asset Group: /Operating System/Windows |
| | Asset Group: /CIOs/Product/Team/{{asset.metadata.qualys.tag-.... |
| | Business Owner Team: {{asset.metadata.github.owner}} |
| | Asset Owner: {{asset.metadata.aws.tags.Owner}} |
| Business Owner Team is any<br>of Awesome New Team!!! Or<br>Source is Qualys | Criticality: Critical |
| | Asset Group: /Applications/{{asset.metadata.github.name}} |
| Asset Group is /Team Naruto/ | Business Owner Team: Ninja Dogs |
| | Asset Group: /Remediation Team/{{asset.metadata.github.owne... |
| BOT - Dependabot Connector | |
| Asset OS is *debian* | Asset Group: /Operating System/Linux |

FIG. 6A (Continued)

Edit Processing Rule

1. Rule Details    2. Actions

General    614

Rule Name: [Windows Systems]

☐ Apply this rule to existing assets on save

Asset Criteria

Filter this rule to select which assets should have action applied. If no asset criteria is entered this rule will match every asset. below must be met to trigger this rule

[All Criteria ▾]

Condition        Value

[Asset OS ▾] [is ▾] [*Windows*]

×

+

[Cancel]                                    [Next]

| Score | Risk Score | Risk Attributes | Total | Active | Vulnerabilities | Last Seen ↕ | OS/Language | Groups |
|---|---|---|---|---|---|---|---|---|
| ◎ | 1000 | ↯ å ▦ | 338 | 1548 | 509 | 40 | 0 | 2022-04-13 | Windows 10 | 5 |
| ◎ | 1000 | ↯ å ▦ | 338 | 1548 | 509 | 40 | 0 | 2022-04-13 | Windows 10 | 5 |
| ◎ | 1000 | ↯ å ▦ | 47 | 1269 | 364 | 6 | 0 | 2022-04-13 | Windows Ser... | 5 |
| ◎ | 1000 | ↯ å ▦ | 15 | 139 | 101 | 1 | 0 | 2022-04-14 | Windows Ser... | 5 |
| ◎ | 1000 | ↯ å ▦ | 8 | 139 | 36 | 0 | 0 | 2022-04-13 | Windows Ser... | 5 |
| ◎ | 1000 | ↯ å ▦ | 1 | 2 | 1 | 0 | 0 | 2022-04-13 | Windows 10 | 5 |
| ◎ | 900 | ↯ å ▦ | 663 | 1454 | 603 | 70 | 0 | 2022-04-21 | Windows 10 | 4 |
| ◎ | 700 | ↯ å ▦ | 0 | 13 | 12 | 3 | 110 | 2022-06-02 | Windows 11... | 12 |
| ◎ | 700 | ↯ å ▦ | 0 | 2 | 0 | 0 | 112 | 2022-06-01 | Windows 10... | 13 |

Displaying 1 - 11 of 11

| Edit Asset | ✕ |

Asset Details \ Risk Attributes \

Repository: [my/repo]          Registry: [registry.io]

Alias: [my/repo]               ⓘ Secondary Registries: [myotherregistory.another.io]

Digest: [sha256:1232344232]    Id: [sha256:13234242332423432423]

Tags: [list]                   OS: [string]

Platform:

| OS: | [linux ▼] | Arch: | [arm64 ▼] |
| OS Version: | [String] | Arch Variant: | [String] |
| OS Features: | [list] | Arch Features: | [list] |

Business Owner
- User [ComboBox ▼]
- Team [ComboBox ▼]

Support Team
- ☐ Different than Business Owner Team
- Team [ComboBox ▼]

Asset Groups: [                    ]

Description: [                    ]

[Save]

FIG. 10

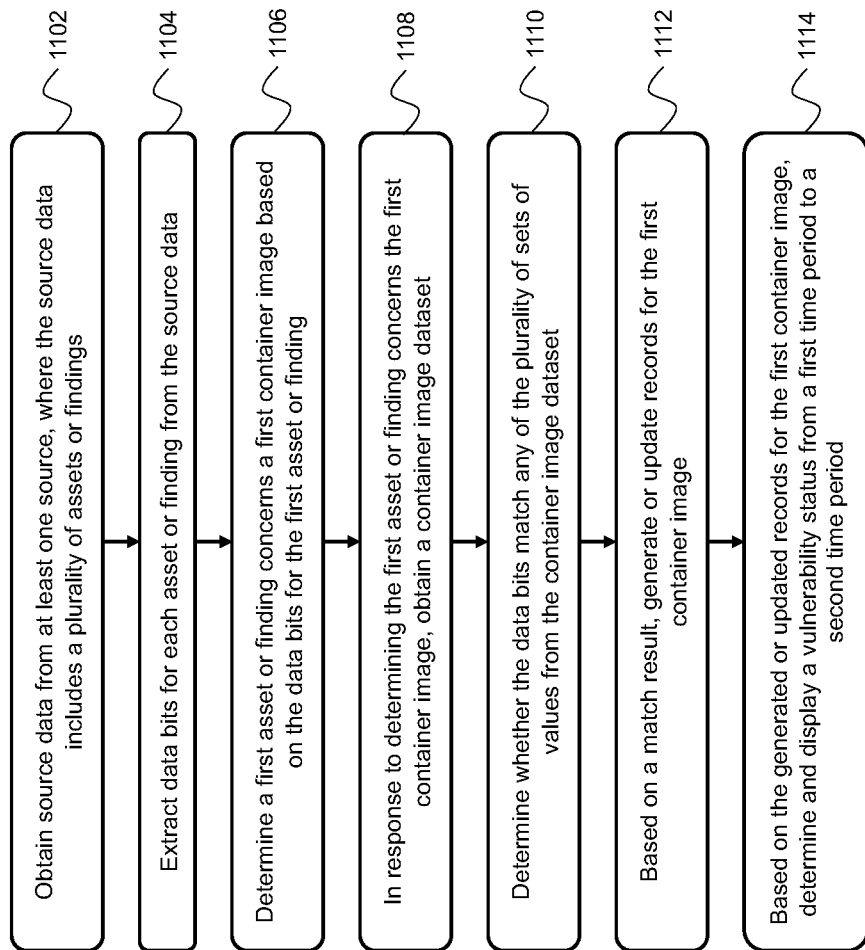

CONTAINER IMAGE DEDUPLICATION FOR VULNERABILITY DETECTION AND MANAGEMENT IN IT SYSTEMS

TECHNICAL FIELD

Various aspects of the present disclosure relate generally to systems and methods for vulnerability detection and management in information technology (IT) systems and, more particularly, to systems and methods for container image deduplication for vulnerability detection and management in IT systems.

BACKGROUND

Generally, vulnerability detection and management in IT systems is difficult, as IT systems are not static (e.g., configurations, software, users, and the like change over time) and are exposed to evolving external actors (e.g., hackers, viruses, and the like). Moreover, IT systems have increased in size and complexity. Thus, timely, intelligent and efficient detection and management of vulnerabilities in IT systems is a challenge.

Different scanners for assets or vulnerabilities may output different types of data with their scan results. In some cases, scanners may output a subset of data available to the scanner when presenting scan results. Moreover, scanners may be inconsistent in data output in scan results and/or have an error rate for re-identifying assets the scanner has previously indexed/detected and reported in scan results.

The present disclosure is directed to overcoming one or more of these above-referenced challenges.

SUMMARY OF THE DISCLOSURE

According to certain aspects of the disclosure, systems, methods, and computer readable memory are disclosed for vulnerability detection and management in IT systems.

In some cases, a system for container image deduplication in asset and vulnerability management may include: at least one memory configured to store instructions; and at least one processor configured to execute the instructions to perform operations. The operations may include: obtain source data from at least one source, wherein the source data includes a plurality of assets and/or findings; extract data bits for each asset or finding from the source data; determine a first asset or finding concerns a first container image based on the data bits for the first asset or finding; in response to determining the first asset or finding concerns the first container image, obtain a container image dataset, wherein the container image dataset includes a plurality of sets of values for identification fields, each of the plurality of sets of values respectively correspond to a container image assets of a plurality of container image assets, and the identification fields include, at least, a repository identifier field and a hash field; determine whether the data bits match any of the plurality of sets of values; based on a match result, generate or update records for the first container image; based on the generated or updated records for the first container image, determine a vulnerability status from a first time period to a second time period; and cause a management graphical user interface to be displayed to a user, wherein the management graphical user interface displays the vulnerability status from the first time period to the second time period.

In some cases, a computer-implemented method for container image deduplication in vulnerability detection and management may include: obtaining source data from at least one source, wherein the source data includes a plurality of assets and/or findings; extracting data bits for each asset or finding from the source data; determining a first asset or finding concerns a first container image based on the data bits for the first asset or finding; in response to determining the first asset or finding concerns the first container image, obtaining a container image dataset, wherein the container image dataset includes a plurality of sets of values for identification fields, each of the plurality of sets of values respectively correspond to a container image assets of a plurality of container image assets, and the identification fields include, at least, a repository identifier field and a hash field; determining whether the data bits match any of the plurality of sets of values; based on a match result, generating or updating records for the first container image; based on the generated or updated records for the first container image, determining a vulnerability status from a first time period to a second time period; and causing a management graphical user interface to be displayed to a user, wherein the management graphical user interface displays the vulnerability status from the first time period to the second time period.

In some cases, a system for container image deduplication in vulnerability detection and management may include: at least one memory configured to store instructions; and at least one processor configured to execute the instructions to perform operations. The operations may include: obtain scanner data from at least one scanner, wherein the scanner data includes a plurality of findings; extract data bits for each finding from the scanner data; determine a first finding concerns a first container image based on the data bits for the first finding; in response to determining the first finding concerns the first container image, obtain a container image dataset, wherein the container image dataset includes a plurality of sets of values for identification fields, each of the plurality of sets of values respectively correspond to a container image assets of a plurality of container image assets, and the identification fields include, at least, a repository identifier field and a hash field; determine whether the data bits match any of the plurality of sets of values; based on a match result, generate or update records for the first container image; based on the generated or updated records for the first container image, determine a vulnerability status from a first time period to a second time period; and cause a vulnerability management graphical user interface to be displayed to a user, wherein the vulnerability management graphical user interface displays the vulnerability status from the first time period to the second time period.

In some cases, a system for host matching in asset and vulnerability management may include: at least one memory configured to store instructions; and at least one processor configured to execute the instructions to perform operations. The operations may include: obtain source data from at least one source, wherein the source data includes a plurality of asset findings and/or vulnerability findings; extract data bits for each asset finding or vulnerability finding from the source data; determine a first asset finding or first vulnerability finding concerns a first host based on first data bits for the first asset finding or the first vulnerability finding; in response to determining the first asset finding or the first vulnerability finding concerns the first host, obtain a search structure, wherein the search structure includes, for each record of a plurality of records of the search structure, known-host values for a set of fields for known hosts; determine whether the first data bits match a record of the search structure in accordance with a tiered set of rules, wherein the tiered set of rules include at least a first match rule and a second match rule, the first match rule is configured to determine whether a native host identifier of the first data bits match a native host field of the record of the search structure, and the second match rule is configured to determine whether a source identifier of the first data bits match a source field of the record of the search structure; based on a match result, generate or update records for the first host; based on the generated or updated records for the first host, determine a vulnerability status from a first time period to a second time period; and cause a management graphical user interface to be displayed to a user, wherein the management graphical user interface displays the vulnerability status from the first time period to the second time period.

In some cases, a computer-implemented method for host matching in asset and vulnerability management may include: obtaining source data from at least one source, wherein the source data includes a plurality of asset findings and/or vulnerability findings; extracting data bits for each asset finding or vulnerability finding from the source data; determining a first asset finding or first vulnerability finding concerns a first host based on first data bits for the first asset finding or the first vulnerability finding; in response to determining the first asset finding or the first vulnerability finding concerns the first host, obtaining a search structure, wherein the search structure includes, for each record of a plurality of records of the search structure, known-host values for a set of fields for known hosts; determining whether the first data bits match a record of the search structure in accordance with a tiered set of rules, wherein the tiered set of rules include at least a first match rule and a second match rule, the first match rule determines whether a native host identifier of the first data bits match a native host field of the record of the search structure, and the second match rule determines whether a source identifier of the first data bits match a source field of the record of the search structure; based on a match result, generating or updating records for the first host; based on the generated or updated records for the first host, determining a vulnerability status from a first time period to a second time period; and causing a management graphical user interface to be displayed to a user, wherein the management graphical user interface displays the vulnerability status from the first time period to the second time period.

In some cases, a system for host matching in asset and vulnerability management may include: at least one memory configured to store instructions; and at least one processor configured to execute the instructions to perform operations. The operations may include: obtain source data from at least one source, wherein the source data includes a plurality of vulnerability findings; extract data bits for each vulnerability finding from the source data; determine a first vulnerability finding concerns a first host based on first data bits for the first vulnerability finding; in response to determining the first vulnerability finding concerns the first host, obtain a search structure, wherein the search structure includes, for each record of a plurality of records of the search structure, known-host values for a set of fields for known hosts; determine whether the first data bits match a record of the search structure in accordance with a tiered set of rules, wherein the tiered set of rules include at least a first match rule and a second match rule, the first match rule determines whether a native host identifier of the first data bits match a native host field of the record of the search structure, and the second match rule determines whether a source identifier of the first data bits match a source field of the record of the search structure; based on a match result, generate or update records for the first host; based on the generated or updated records for the first host, determine a vulnerability status from a first time period to a second time period; and cause a vulnerability management graphical user interface to be displayed to a user, wherein the vulnerability management graphical user interface displays the vulnerability status from the first time period to the second time period.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIGS. 6A-6F depict graphical user interfaces (GUIs) for vulnerability detection and management.

FIG. 10 depicts a graphical user interface for container image deduplication in vulnerability detection and management.

FIG. 11 depicts a flowchart of an exemplary routine for container image deduplication in vulnerability detection and management.

DETAILED DESCRIPTION

Various aspects of the present disclosure relate generally to vulnerability detection and management in IT systems using container image deduplication. For instance, in some cases, scanners may detect thousands or millions of data points (e.g., vulnerabilities and the like) for thousands or millions of assets of IT systems of an organization. Systems of the present disclosure may manage, over time, very large numbers (e.g., millions, billions, or more) of records regarding the data points (e.g., vulnerabilities and the like) for the thousands or millions of assets of IT systems of organization(s). Thus, systems of the present disclosure may perform certain actions to be precise (e.g., avoid false positives and false negatives) while being computationally efficient (for both memory and processor time).

In some cases, the system of the present disclosure may process scan results from third-party scan application. These scan results may be under-inclusive in providing available data or over-inclusive in identifying new assets in the course of scanning for assets and/or vulnerabilities. The systems and methods of the present disclosure may deduplicate assets indicated in scan results by performing matching processes that are specifically designed to overcome (a) the variability of scan results (between scanners and for a particular scanner over time) and (b) partial data provided by scan results. In this manner, the systems and methods of the present disclosure may track assets and vulnerabilities with a high degree of accuracy, even with poor data provided by scanners. Moreover, the systems and methods of the present disclosure may reassemble a more complete set of data for assets even when individual scanners (over time or from different scanners) only provide a partial set of data for assets, thereby increasing an accuracy rate over time for the systems of the present disclosure.

Thus, methods and systems of the present disclosure may be improvements to computer technology and/or vulnerability detection and management in IT systems.

Environment

Figure 1:
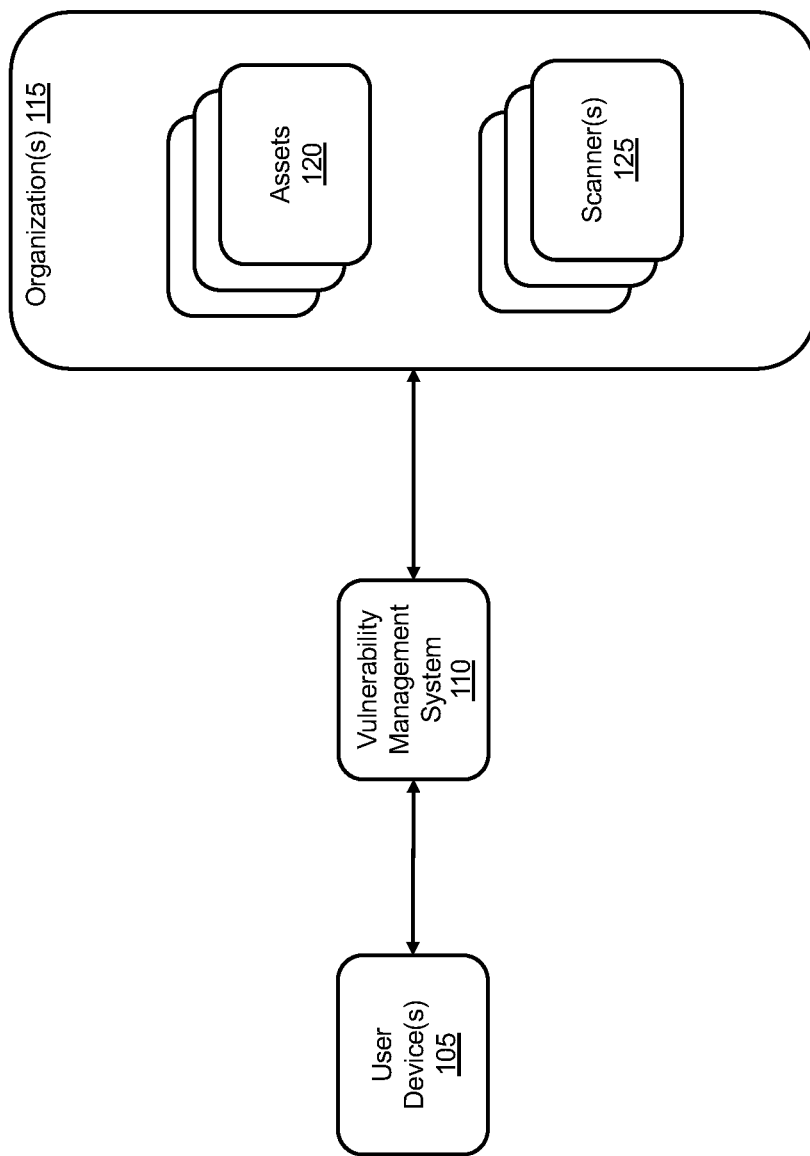
FIG. 1 depicts an example environment for vulnerability detection and management in IT systems.

FIG. 1 depicts an example environment 100 for vulnerability detection and management in IT systems. The environment 100 may include user device(s) 105, a vulnerability management system 110 and organization 115.

The user device(s) 105 (hereinafter referred to as "user device 105" for clarity of reference) may be various different types of devices, including computing devices (e.g., tablet, mobile phone, desktop computer, and the like), extended reality (XR) devices (e.g., augmented reality devices, virtual reality devices, mixed reality devices, and the like), and the like, that communicate using wired (e.g., ethernet, and the like) or wireless communication standards (e.g., WIFI, and the like). In some cases, the user device 105 may be a smartphone with an application to interface with the vulnerability management system 110. In some cases, the user device 105 may be a computing device operated by a user to interface with vulnerability management system 110 via a web interface or desktop application. In some cases, the user device 105 may be an XR device operated by a user to interact with the vulnerability management system 110 via XR applications, such as virtual reality devices, augmented reality devices, mixed reality devices, and the like. Generally, one or more such user devices 105 may connect to the vulnerability management system 110, via one or more wireless or wired communications systems, such as local networks, private networks, or the internet. In this manner, the user devices 105 may connect to and communicate with the vulnerability management system 110, as discussed herein.

The organization(s) 115 (hereinafter referred to as "organization 115" for clarity of reference) may be IT systems associated with entities (e.g., a business, government agency, other enterprise, or any subgroup or division thereof) and/or individuals. Each organization of the organization(s) 115 or individual may have an account with the vulnerability management system 110. The account may by managed by administrator(s) and/or IT security personal of the organization or the individual (collectively referred to as "users"). Each user of the organization may have a shared or separate account, with same or different access and authorizations to the account. The users may interact with the vulnerability management system 110 via the user devices 105.

An organization 115 may include a plurality of assets 120. The plurality of assets 120 may include, but is not limited to, network equipment (e.g., routers, modems, and the like) at locations associated with the organization 115, user devices 105 associated with the organization 115, office equipment (e.g., printers, scanners, and the like) associated with the organization 115, servers associated with the organization 115, software hosted any of the foregoing or hosted in cloud service providers, and the like.

An organization 115 may also include or be associated with at least one vulnerability scanner 125. In some cases, the organization 115 may host and execute a scanner 125 as an asset of the plurality of assets 120 to perform scanner functions. In some cases, the organization 115 may use a third party scanner 125 (e.g., that is managed by a third party) to perform scanner functions. The third party scanner 125 may be hosted and executed locally on behalf of the organization 115 and managed remotely by the third party. In some cases, the scanner 125 may be hosted and executed remotely (e.g., by the third party or in the cloud) and access relevant data to perform scanner functions. In some cases, the vulnerability management system 110 may host and/or manage the scanner 125 for the organization 115. In some cases, the vulnerability management system 110 may not host and/or manage the scanner 125 for the organization 115, but may instead receive scanner data from the scanner 125. In some cases, the organization 115 may have or be associated with only one scanner 125. In some cases, the organization 115 may have or be associated with two, three, or a plurality of scanners 125. For instance, different scanners 125 may focus on different aspects of the organization 115 (e.g., hardware versus software, and the like) or may be configured to detect different vulnerabilities or different categories of vulnerabilities.

A scanner 125 may obtain raw data about both vulnerabilities in the organization 115 and about the plurality of assets 120 of the organization 115 and output scanner data. The raw data, for each asset, may include one or combinations of: asset type (e.g., device (user device, server, printer, etc.), software (e.g., web server application, container, endpoint, and the like), asset name, asset ID (if embedded in asset metadata by the vulnerability management system 110), asset configuration, asset parameters, and/or device data (if hardware). An asset ID may uniquely identify an asset within the vulnerability management system 110, such that no two assets have a same asset ID. The scanner data may indicate vulnerabilities based on the raw data. The scanner data may be formatted according to output structure rules of the scanner 125. Generally, the scanner data may indicate at least a scan date (e.g., year, month, day, and time) and any vulnerabilities in vulnerability data. The vulnerability data may include asset ID data (e.g., an asset ID or data to ID an asset) and finding data (e.g., a common vulnerabilities and exposures (CVE) ID or ID particular to the scanner 125) to indicate the vulnerability. In some cases, the vulnerability data may also include vulnerability location data (e.g., port 80, software code, and the like) and/or severity data (e.g., critical, informational, and the like).

In some cases, a scanner 125 may also scan for assets separate from (or as a part of) scanning for vulnerabilities on assets. In some cases, a different asset scanner may scan for assets on a network associated with the organization 115.

Figure 2:
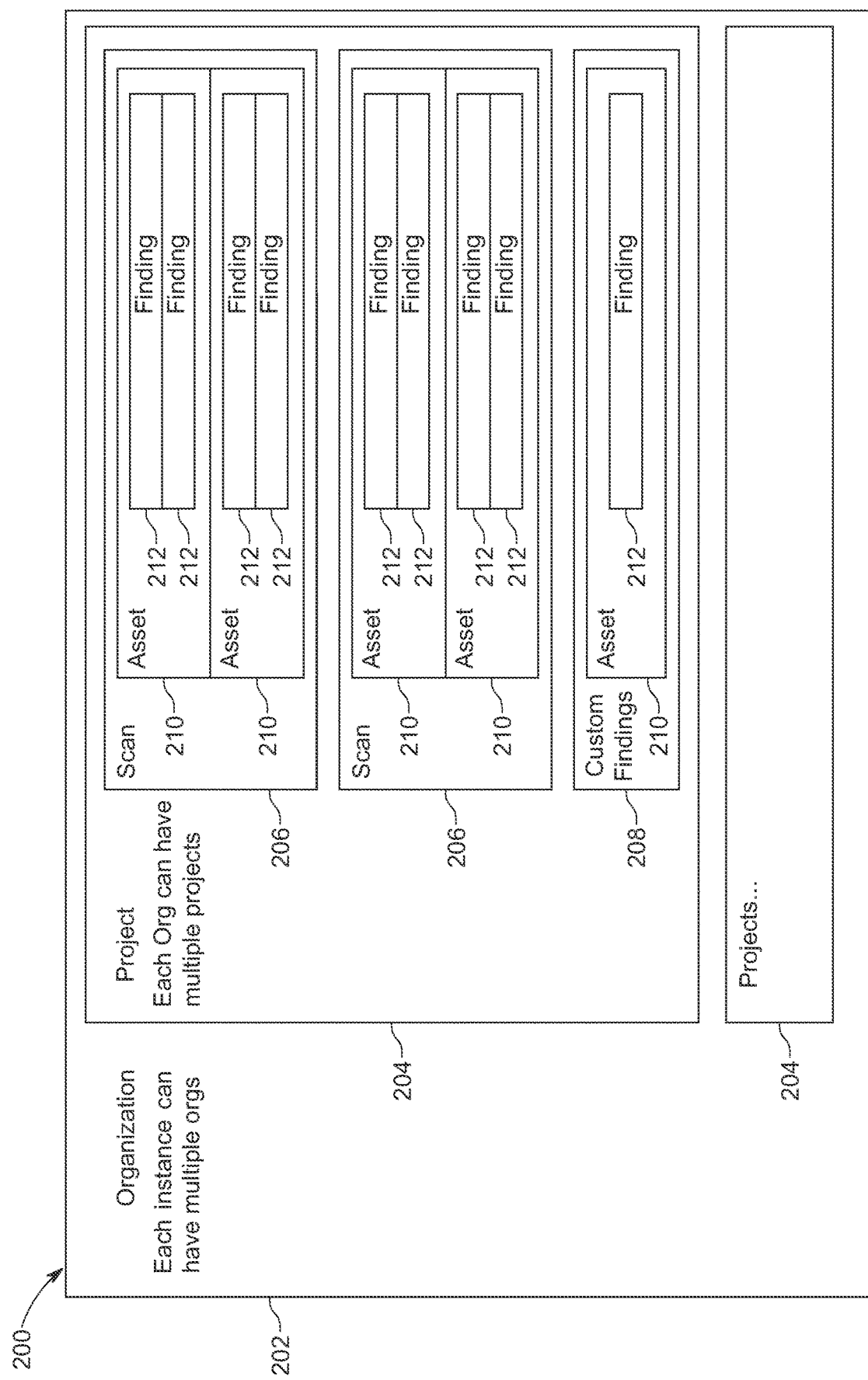
FIG. 2 depicts a block diagram depicting scan results.

Turning to FIG. 2, FIG. 2 depicts a block diagram depicting scan results 200. The scan results 200 may include scanner data schematically viewed from an instance of the vulnerability management system 110. Each instance (e.g., hosted on a server locally or in a cloud environment) of the vulnerability management system 110 may manage at least one organization 202. Each organization 202 may be associated with an account, as discussed herein with regards to an organization 115. Each organization 202 may include one or more projects 204. Each project 204 may have a project ID and may correspond to a set of assets (e.g., some of the plurality of assets 120 of IT systems associated with the organization 202). Each discrete output of scanner data (over time) from a scanner 125 (or scanners 125) may be a scan 206 for one or more assets 210. The scanner data may indicate findings 212 on the one or more assets 210. In some cases, a custom finding 208 may be obtained for a finding 212 on an asset 210. For instance, the custom finding 208 may be input by a user input on a user interface on the user device 105 or input, from a user device 105, via an API of the vulnerability management system 110.

Returning to FIG. 1, the vulnerability management system 110 may obtain data regarding the plurality of assets 120, group the assets into groups based on the data and/or user inputs, and perform vulnerability management actions for the assets in the groups. In some cases, the vulnerability management system 110 may obtain scanner data regarding the assets, determine a plurality of trend records that include an indication of a change in a vulnerability status from a first time period to a second time period, and perform vulnerability management actions for the assets, such as inform (e.g., display, transmit, alert, and the like) a user of the change in a vulnerability status.

A. Grouping Assets

In some cases, the vulnerability management system 110 may group assets based on asset attributes and/or user inputs (e.g., manually assigning them to groups). For instance, the vulnerability management system 110 may obtain asset information for an organization 115. The asset information may indicate some or all of the plurality of assets 120. The vulnerability management system 110 may obtain the asset information from a user input (e.g., via a user interface), via an input from a user device to an application programming interface (API) of the vulnerability management system 110, and/or from an API of an asset scanner (e.g., one of the scanners 125). For instance, to obtain the asset information for the organization, the vulnerability management system 110 may use a scanning tool (e.g., an asset scanner) to generate finding information (e.g., a list of assets with asset IDs or data to ID assets). The vulnerability management system 110 may extract the asset information from the finding information.

In some cases, the vulnerability management system 110 may obtain a set of grouping rules. The set of grouping rules may define a plurality of groups based on asset attributes. To obtain the set of grouping rules, the vulnerability management system 110 may: (1) receive user interactions with a web user interface to generate conditions to define the set of grouping rules (see, e.g., FIGS. 6A-6F), (2) receive a user upload of a file including a syntax-correct data structure that indicates conditions to define the set of grouping rules, and/or (3) receive data at an API of vulnerability management system 110 to provide conditions to define the set of grouping rules. Each grouping rule may include one or more conditions, thus the grouping rule may be arbitrarily complex logical operators on values of asset attributes, to thereby determine which assets belong to a defined group. The vulnerability management system 110 may enable users to generate the grouping rules, so that assets may be managed as a group. The attributes of assets may include asset name, asset IP address, asset group, asset OS, business owner, business owner team, support team, source, connector, and the like.

In some cases, the vulnerability management system 110 may obtain asset data from at least one source. For instance, the plurality of assets 120 indicated by the asset information may be a first collection of asset data, and the system 110 may periodically (or in response to a user request), re-obtain asset data to ensure the plurality of assets 120 is current (e.g., new assets are added, old assets are removed, etc.). The asset data may indicate particular attributes for at least a subset of assets of the plurality of assets. To obtain the asset data from the at least one source, the vulnerability management system 110 may (1) obtain data for specific assets by user interactions with a web user interface and/or file upload, or (2) obtain data from one or more APIs. The one or more APIs may be APIs of data connectors including: asset management tools, scanners (e.g., a scanner 125), ticketing tools, communication tools, cloud-tools, and the like. The asset data may include asset metadata, including attributes of an asset, such as asset name, asset IP address, asset group, asset OS, business owner, business owner team, support team, source, connector, and the like.

In some cases, the vulnerability management system 110 may determine at least one specific group for each of the subset of assets. In some cases, the vulnerability management system 110 may determine at least one specific group for each of the subset of assets based on the set of grouping rules and the particular attributes. In some cases, the vulnerability management system 110 may determine at least one specific group for each of the subset of assets based on user inputs manually selecting a group for an asset. In some cases, one or more of the assets may be categorized as belonging to a plurality of groups.

Generally, the vulnerability management system 110 may determine at least one group for each asset of the plurality of assets 120, thereby populating the plurality of groups (e.g., some or all of the groups) with assets. In some cases, a group may not have an asset. In some cases, all groups may have at least one asset.

In some cases, the plurality of groups includes at least one or more layers of a hierarchy of groups. For instance, a first group may have at least one child group, and a first child group of the first group may have at least one second child group, and so on. As an example, a first group may be Windows operating systems, a child group of Windows operating machines may be servers, a child group of servers (of Windows operating machines) may be Windows server 2022, and so on. The one or more layers of the hierarchy of groups may include at least a first layer of groups and a second layer of groups. In some cases, a subset of groups in the second layer of groups are nested under a group in the first layer of groups. The subset groups in the second layer of groups nested under the group in the first layer may share a same attribute as the group in the first layer. For instance, Windows server 2022 may share a server attribute with Windows server 2021, and Windows server 2022 may share an operating system attribute with Windows 11 personal computing devices. The one or more layers may include up to a predetermined number of layers. For instance, to reduce recursive looping, the predetermined number of layers may be limited to, e.g., 5, 10, or 20, or the like.

In some cases, to determine a group for an asset, the vulnerability management system 110 may: (1) determine attributes for the asset; (2) determine a grouping rule for the group is satisfied by the attributes for the asset; and (3)

associate the asset with the group. For instance, the vulnerability management system 110 may determine the attributes for the asset by extracting the attributes from the asset data. The vulnerability management system 110 may determine whether any grouping rule of the set of grouping rules is satisfied (e.g., by applying the conditions of each grouping rule to values of the attributes).

In some cases, the vulnerability management system 110 may, if the group associated with the asset is a nested group, associate the asset with each parent group in each higher order layer. For instance, if the asset is a Windows Server 2022, the vulnerability management system 110 may associate the asset to the Windows Server 2022 group (a nested group of Windows Servers), associate the asset with the Windows Servers groups (a nested group of Windows operating systems), and associate the asset with the Windows operating system group. Thus, an asset may be associated to multiple groups. In some cases, each asset may be associated to only one lowest level group. In some cases, an asset may be associated to (only) lowest level groups (one or multiple).

In some cases, the vulnerability management system 110 may generate an asset data structure associating asset IDs and asset metadata (which may be used to ID assets), and generate an asset-group data structure associating each asset of the subset of assets to a first group, thereby grouping the subset of assets into the first group. Similarly, the vulnerability management system 110 may associate each asset with at least one group in the data structure. For instance, the data structure may be an asset-group table. The asset-group table may indicate asset(s) associated with certain groups, via asset IDs and group IDs. Group IDs may uniquely identify groups within the vulnerability management system 110.

In some cases, the vulnerability management system 110 may perform at least one vulnerability management action using a command that applies to all of the assets, and only the assets, of the first group. In some cases, the vulnerability management system 110 may perform a vulnerability management action that applies to a higher level group (if the asset is in a nested group). Generally, the vulnerability management system 110 may have a plurality vulnerability management actions that are triggered for different assets and/or groups in accordance with trigger conditions (e.g., asset has vulnerability detected). Some vulnerability management actions may be triggered for specific groups and/or specific assets (e.g., transmit a message to an endpoint associated with that specific group and/or specific asset), while some vulnerability management actions may apply to all assets and/or groups (e.g., displaying data associated therewith).

In some cases, the vulnerability management system 110 may detect vulnerability(s) for assets of the subset of assets and/or groups of the plurality of groups; and perform one or combinations of: display the vulnerability(s) for the assets based on the groups, or display summaries of the vulnerability(s) of the assets on a group-basis. For instance, the vulnerability management system 110 may summarize vulnerability(s) for assets on a group basis, on an asset basis, on an organizational basis, and the like. In this manner, vulnerability(s) for assets may be communicated to users of the vulnerability management system 110.

In some cases, to perform the at least one vulnerability management action using the command that applies to all of the assets, and only the assets, of the first group, the vulnerability management system 110 may: detect a vulnerability (e.g., based on new scanner data/trend records) for an asset of the first group, and perform one or combinations of: (1) transmit an alert to a defined endpoint for the asset and/or first group, (2) flag the first group on login, (3) generate external ticket(s) and assign based on the first group, (4) generate report(s) based on the first group, and/or (5) trigger one or more automation rules based on the first group. To transmit an alert to a defined endpoint, the vulnerability management system 110 may transmit a message to a user device associated with the asset and/or first group. To flag the first group on login, the vulnerability management system 110 may detect a user associated with the asset and/or first group has logged into the system, and display an alert symbol. To generate external ticket(s) and assign based on the first group, the vulnerability management system 110 may retrieve a ticket rule that defines ticket generation (e.g., form and content) and which user to receive the ticket, and generate the ticket in accordance with the ticket rule. To generate report(s) based on the first group, the vulnerability management system 110 may retrieve a report rule that defines a report generation (e.g., form and content) and populate the report in accordance with the report rule. To trigger one or more automation rules based on the first group, the vulnerability management system 110 may retrieve automation trigger rules; determine whether any automation trigger rules are satisfied; if any automation trigger rules are satisfied, trigger corresponding automation trigger rules. Automation trigger rules may disable the asset, monitor the asset, and the like. In this manner, assets in groups may have defined actions performed in accordance with their group membership and vulnerability detection and management may be more efficiently managed on a group basis instead of only an asset basis.

In some cases, the vulnerability management system 110 may group assets for a particular service and perform vulnerability actions for the service. For instance, the vulnerability management system 110 may obtain service data indicating tags ("service tags") for assets to associate the assets with a particular service. For instance, the vulnerability management system 110 may receive user inputs tagging certain assets, or a project may correspond to a service (e.g., payments, account services, and the like) and the vulnerability management system 110 may automatically tag assets of the project with the service tag. In some cases, the assets associated with the particular service may include a full stack for the particular service. The full stack may include device(s), OS(s), and/or web application(s) to provide the service. The vulnerability management system 110 may then form a service group based on the tags and a service grouping rule. Subsequently, the vulnerability management system 110 may detect a vulnerability for an asset of the service group; and perform one or combinations of: (1) transmit an alert for the service group, (2) flag the service group on login, (3) generate external ticket(s) and assign based on the service group, (4) generate report(s) based on the service group, and/or (5) trigger one or more automation rules based on the service group. In this manner, assets in service groups may have defined actions performed in accordance with their group membership in service groups and vulnerability detection and management may be more efficiently managed on a service group basis instead of only an asset basis. Moreover, services which are of high importance for business, safety, and the like may be monitored and detected on a service basis, in contrast to an IT system-wide basis.

In some cases, the vulnerability management system 110 may group assets for portions of the organizational hierarchy and perform vulnerability actions for the portions of the organizational hierarchy. For instance, the vulnerability management system 110 may obtain an organizational hierarchy; and map assets onto portions of the organizational hierarchy and associate the assets with the portions of the organizational hierarchy (e.g., groups for the portions of the organizational hierarchy). For instance, the vulnerability management system 110 may determine whether assets have a certain attribute (e.g., user role of user of asset) and associate the asset with a group that corresponds to the portion of the organizational hierarchy that corresponds to the certain attribute. The certain attribute may be a HR classification (e.g., employee title, employee division, employee role, employee location), or the certain attribute may be a flag to define a group (e.g., development, operations, sales, and the like). As an example, an asset may have a development attribute (e.g., in metadata of the asset), and the vulnerability management system 110 may associate the asset with a development portion (e.g., a development group) of the organizational hierarchy. The vulnerability management system 110 may then detect a vulnerability for an asset of a portion of organizational hierarchy; and perform one or combinations of: (1) transmit an alert for the portion of organizational hierarchy, (2) flag the portion of organizational hierarchy on login, (3) generate external ticket(s) and assign based on the portion of organizational hierarchy, (4) generate report(s) based on the portion of organizational hierarchy, and/or (5) trigger one or more automation rules based on the portion of organizational hierarchy. In this manner, assets in a group for a portion of the organizational hierarchy may have defined actions performed in accordance with their group membership in an organizational hierarchy group and vulnerability detection and management may be more efficiently managed on an organizational hierarchy basis instead of only an asset basis. Moreover, groups in the organizational hierarchy which are of high importance for business, safety, and the like may be monitored and detected on an organizational hierarchy basis, in contrast to an IT system-wide basis.

In some cases, the vulnerability management system 110 may obtain new asset data from the at least one source (e.g., in a same manner as discussed herein), and (2) update the data structure to add assets to, remove assets from, or move assets between groups of the plurality of groups based on the new asset data (e.g., attributes of assets have changed). In this manner, relationships between assets and groups may be kept updated and vulnerability management may be efficiently allocated.

B. Trend Records

In some cases, the vulnerability management system 110 may obtain scanner data regarding the assets, determine a plurality of trend records that include an indication of a change in a vulnerability status from a first time period to a second time period, and perform vulnerability management actions for the assets.

In some cases, the vulnerability management system 110 may obtain the scanner data from at least one scanner 125. The scanner data may include a plurality of findings regarding one or more assets of the plurality of assets 120. For instance, vulnerability management system 110 may request the scanner data or periodically receive the scanner data (e.g., each day, each hour, etc.) from the scanner 125. The scanner data may be a data structure (e.g., text file, JSON, and the like) generated in accordance with software of the scanner 125.

In some cases, the vulnerability management system 110 may extract data bits for each finding from the scanner data. To extract the data bits for each finding from the scanner data, the vulnerability management system 110 may: determine a type of scanner; determine a scanner model based on the type of scanner; and extract, for each finding, the data bits for the finding using the scanner model. For instance, the vulnerability management system 110 may determine the type of scanner based on metadata of the scanner data, the format of the scanner data, an IP address of the data packet transmitting the scanner data, and the like. Scanner models may be parsers designed to extract all or relevant parts from the scanner data, based on previous scanner data from the scanners 125. The data bits may include the scan date and vulnerability data, as discussed herein (e.g., asset ID (or information to ID an asset, such as asset metadata), vulnerability information (e.g., finding data such as CVE or other information to ID a vulnerability) and the like).

In some cases, the vulnerability management system 110 may determine, for each finding, a set of values based on the extracted data bits. The set of values may include at least an asset ID (of the vulnerability management system 110), and a vulnerability ID. In some cases, the set of values also includes a scan date and a key value. A key value may uniquely identify a vulnerability on a particular asset, such that a same vulnerability on a first aspect (e.g., port or portion of code, and the like) can be differentiated from a same vulnerability on a second aspect (e.g., port or portion of code, and the like) of a same asset. The vulnerability management system 110 may use the asset ID and the key value to differentiate a same vulnerability across different assets and within a single asset.

In some cases, to determine, for each finding, the set of values, the vulnerability management system 110 may normalize the data bits for a finding into a defined format; determine an asset ID for an asset for the finding; determine a vulnerability ID for the finding; and set at least the asset ID and the vulnerability ID as the set of values. To normalize the data bits for a finding into a defined format, the vulnerability management system 110 may convert scan dates into a certain format (e.g., year-month-day-time). Generally, determining the asset ID and vulnerability ID may also be considered "normalizing" actions as the asset ID and vulnerability ID may be converted into formats/data structures defined by vulnerability management system 110.

In some cases, to determine the asset ID, the vulnerability management system 110 may: obtain asset metadata from the data bits for the finding; determine whether the asset metadata corresponds to an existing asset; in response to determining the asset metadata corresponds to the existing asset, retrieve the asset ID for the existing asset; and, in response to determining the asset metadata does not correspond to the existing asset, generate a new asset record and obtain a new asset ID as the asset ID. The asset metadata may include attributes of an asset, such as asset name, asset IP address, asset group, asset OS, business owner, business owner team, support team, source, connector, and the like. To determine whether the asset metadata corresponds to an existing asset, the vulnerability management system 110 may search the asset data structure and/or the asset-group data structure for an asset that has a same set of asset attributes (or near similar, as certain attributes may be mutable over time). If a match (or near match) is found, the vulnerability management system 110 may retrieve an asset ID for the matching (or near match) asset. If no match (or near match) is found, the vulnerability management system 110 may add the asset to the asset data structure and/or add asset to the asset-group data structure (e.g., by determining whether the asset belongs to a group in accordance with grouping rules).

In some cases, to determine the vulnerability ID for the finding, the vulnerability management system 110 may: obtain finding data from the data bits for the finding; and determine the vulnerability ID based on the type of scanner and the finding data. For instance, in some cases, the scanner 125 may indicate a CVE ID as a part of the finding data, while in other cases, the scanner 125 may indicate a proprietary ID for a vulnerability. Thus, to determine the vulnerability ID based on the type of scanner and the finding data, the vulnerability management system 110 may: determine whether the finding data is a CVE based on the type of scanner; and in response to determining the finding data is the CVE based on the type of scanner, set the vulnerability ID as the CVE from the finding data. In the case that the finding data does not include the CVE based on the type of scanner, the vulnerability management system 110 may use a lookup function based on the type of scanner and the finding data to retrieve the vulnerability ID. The lookup function may be defined for each scanner 125 that does not include CVE in the finding data. The lookup function may define a CVE to each proprietary code used by scanners 125 that do not use CVE. In the case that the lookup function fails to return a match (e.g., for that scanner type or finding data), the vulnerability management system 110 may treat the finding in accordance with any indicated severity data associated therewith (e.g., critical, and the like). In some cases, the scanner 125 may provide the severity data in a first format or classification, and the vulnerability management system 110 may convert or map the severity data into a normalized manner. In this manner, the scanner data may be processed into a defined format for use by the vulnerability management system 110. In some cases, the scanner data is stored (e.g., for a set period of time), so that the vulnerability management system 110 may retrieve the scanner data to examine/analyze it for changes over time. In this manner, the vulnerability management system 110 may map different vulnerability classifications to a single vulnerability classification system used by the vulnerability management system 110.

In some cases, the vulnerability management system 110 may store, for each finding, a finding record in a finding data structure. A finding record may include the set of values for a finding. For instance, the finding data structure may be a finding table. The finding record may include at least an asset ID (of the vulnerability management system 110), and a vulnerability ID. In some cases, the finding record may also include a scan date and a key value. The vulnerability management system 110 may, periodically, based on a user input via a user device, or in response to a clean-up trigger or pendency timer, remove (e.g., stale) finding records from the finding data structure. For instance, the vulnerability management system 110 may remove (e.g., delete or move from the finding data structure to an inactive asset finding data structure) finding records that are more than a threshold period old, or remove finding records for assets (based on asset ID) that are no longer active (e.g., for a threshold period of time). In this manner, finding data for vulnerabilities may be stored for analysis and tracking and the vulnerability management system 110 may avoid additional computational resources to re-process raw scanner data.

In some cases, the vulnerability management system 110 may determine a key value for each of a plurality of findings of a scan event (e.g., for each finding in scanner data). The key value may differentiate a vulnerability of a finding from other vulnerabilities on a same asset (e.g., even if the vulnerabilities have a same vulnerability ID).

In some cases, the key value may be based on at least a vulnerability ID for a finding and at least one additional data bit of the finding. In some cases, the at least one additional data bit includes one or combinations of: a parameter of a web application, a port of a host, a portion of code, and/or a container build version. In some cases (e.g., for certain vulnerability types that are specific to an aspect of the asset), the key value may be a join of the vulnerability ID and a data bit (e.g., port number), so as to ensure differentiation between vulnerabilities of a same type on a same asset on a different aspect of the asset (e.g., a different port). In some cases (e.g., for certain vulnerability types that are not specific to an aspect of the asset), the key value may be a hash the vulnerability ID and the at least one additional data bit (e.g., portion of code) to obtain a hash value. In this manner, the key value for a first vulnerability may be differentiated from a key value of a same vulnerability on a same asset that is found in a different aspect (e.g., different portion of code) of the asset.

In some cases, the vulnerability management system 110 may determine at least one analytic record for the plurality of findings. For instance, the vulnerability management system 110 may generate a scan key value to differentiate a scan event occurring for the scanner data and generate scan metrics. The scan key value may uniquely identify a scan event corresponding to the scanner data being processed. The scan metrics may aggregate counts of finding types or other metrics for the scanner data. For instance, the scan metrics may include a count of different severity types based on the severity data of the scanner data. The vulnerability management system 110 may then perform one or combinations of: (1) in a first type of analytic record, associate the scan key value with at least a scan date in a first analytic data structure; (2) in a second type of analytic record, associate the scan key value and the scan metrics in a second analytic data structure; and/or (3) in a third type of analytic record, associate the scan key value, asset IDs, and vulnerability IDs in a third analytic data structure.

In some cases, the first type of analytic record may associate the scan key value with the scan date and, optionally, a source (e.g., scanner ID of scanner 125). In some cases, the first type of analytic record may associate the scan key value with the scan date, so to associate the scan key value with analytic record for all finding data across all data sources (e.g., asset scanners) and/or scanner 125 up to the scan date of the scanner data. The first analytic data structure may be a first analytic table. The first analytic data structure may track and associate scans (e.g., source and date) with scan key values. In this manner, the vulnerability management system 110 may use the scan key values to differentiate analytic records over time.

In some cases, the second type of analytic record may associate the scan metrics to the scan key value. In some case cases, the scan metrics may be for a corresponding scanner data or for all finding data across all data sources (e.g., asset scanners) and/or scanner 125 up to the scan date of the scanner data. The second type of analytic record may also include in the association a severity level (critical, high, medium, low, information, and the like) and/or a vulnerability ID. The second analytic data structure may be a second analytic table. The second analytic data structure may track and associate scan metrics (e.g., counts, vulnerability IDs, severity levels) with scan key values. In this manner, the vulnerability management system 110 may use the scan key values to differentiate and track scan metrics over time.

In some cases, the third type of analytic record may associate the scan key value, asset IDs, and vulnerability IDs of a scanner event (e.g., from a same scanner data). The third type of analytic record may also associate key values for the vulnerabilities of the scan event. The third analytic data structure may be a third analytic table. The third analytic data structure may track and associate findings (e.g., asset ID, vulnerability ID, and/or key value) with scan key values. In this manner, the vulnerability management system 110 may use the scan key values to differentiate and track findings over time.

In some cases, the vulnerability management system 110 may store the at least one analytic record in at least one analytic data structure. For instance, the vulnerability management system 110 may store the first type of analytic records in the first analytic data structure, store the second type of analytic records in the second analytic data structure, and store the third type of analytic records in the third analytic data structure. The vulnerability management system 110 may, periodically, based on a user input via a user device, or in response to a clean-up trigger or pendency timer, remove (e.g., stale) analytic records from the analytic data structures. For instance, the vulnerability management system 110 may remove (e.g., delete or move from an analytic data structure to an inactive analytic data structure) analytic records that are more than a threshold period old, or remove analytic records for assets (based on asset ID) that are no longer active (e.g., for a threshold period of time). In this manner, analytic records for vulnerabilities may be stored for analysis, tracking, and reporting and (after removal) the vulnerability management system 110 may avoid additional computational resources to process increasingly large datasets of records.

In some cases, the vulnerability management system 110 may determine a plurality of trend records based on the finding data structure and/or the at least one analytic data structure. The plurality of trend records may include an indication of a change in a vulnerability status from a first time period to a second time period. The plurality of trend records may include a trend date (corresponding to one or more scan key values, which correspond to one or more scanner data sets from scanner(s) 125 scanning the organization 115 on that date), asset ID, vulnerability ID, and, optionally, a key value for a finding. The finding of a trend record may be a finding in the scanner data or a finding that was previously discovered but not in the scanner data for the trend date.

In some cases, the vulnerability management system 110 may store the plurality of trend records in a trend data structure. For instance, the trend data structure may be a trend table. The trend data structure may associate trend statuses with asset IDs, vulnerability IDs, and a trend date (and optionally a key value for the finding). In this manner, the vulnerability management system 110 may track changes over time for vulnerabilities and indicate a trend status for a vulnerability.

For instance, the vulnerability management system 110 may use trend statuses to indicate the change in a vulnerability status from a first time period to a second time period. Examples of trend statuses to indicate the change in a vulnerability status are presented in Table 1.

TABLE 1

| Trend Status | | |
|---|---|---|
| Status | Means | Explanation |
| 0 | Active | This finding was found in the past and is still present |

TABLE 1-continued

| Trend Status | | |
|---|---|---|
| Status | Means | Explanation |
| 1 | Discovered | When a finding is found for the first time |
| 2 | Discovered and mitigated | When a finding is found for the first time and is also mitigated on the same day |
| 3 | Manually mitigated first time | The first time a finding is manually mitigated it is set to this status. The system may use this trend date as the "mitigated date" for the finding |
| 4 | Scan mitigated | This finding was in a previous analytic but not in the latest scan, which means it was mitigated via scan results |
| 5 | Manually mitigated still | A manually mitigated finding still shows up in the scanner data since it still exists. This status indicates to the system that it is still manually mitigated, and may not be used for mitigation calculations |

In some cases, to determine the plurality of trend records based on the finding data structure and/or the at least one analytic data structure, the vulnerability management system 110 may: compare different scan events (e.g., different scanner data sets with different scan key values) by comparing analytic records associated with different scan key values to determine the change in a vulnerability status from a first time period to a second time period.

In some cases, to determine a trend status as discovered or active, the vulnerability management system 110 may determine whether an analytic record of a newest scan key value matches an analytic record of a previous scan key value. In the case that the analytic record of the newest scan key value does not match any analytic record of the previous scan key value, the vulnerability management system 110 may generate a trend record and determine a trend status for the trend record as discovered. In the case that the analytic record of the newest scan key value does match an analytic record of the previous scan key value, the vulnerability management system 110 may generate a trend record and determine a trend status for the trend record as active.

The vulnerability management system 110 may associate the trend record with the scan date (or scan key value). To determine whether an analytic record of a newest scan key value matches an analytic record of a previous scan key value, the vulnerability management system 110 may select a third type of analytic record from the third analytic data structure that is associated with the newest scan key value, and determine whether any of the third type of analytic records associated with other scan key values have a same asset ID, vulnerability ID, and key value. In some cases, the vulnerability management system 110 may select each new third type of analytic record iteratively or in parallel, to determine whether prior records (for asset ID, vulnerability ID, and key value) already exist in the third data structure. In some cases, the vulnerability management system 110 may use database search syntax, such as SQL syntax search, to efficiently search the thousands to billions of records. For instance, the vulnerability management system 110 may use join, union, select, where, and the like. In this manner, new vulnerabilities (e.g., not previously detected before) may be efficiently detected, and vulnerabilities that are still active (e.g., detected before, and are detected again) may be efficiently detected.

For instance, to determine a trend status as scan mitigated, the vulnerability management system 110 may determine whether an analytic record of a newest scan key value matches an analytic record of a previous scan key value. In the case that the analytic record of any previous scan key value does not match any analytic record of the newest scan key value, the vulnerability management system 110 may generate a trend record and determine a trend status for the trend record as scan mitigated. In this manner, vulnerabilities that have been mitigated may be updated and efficiently detected, as the vulnerability may have been fixed and the vulnerability management system 110 may detect that it is not present anymore.

In some cases, to determine a trend status as manually mitigated, the vulnerability management system 110 may obtain a justification data structure that includes justification records. The justification records may include an association of asset ID, vulnerability ID, key value, and mitigation data. The mitigation data may indicate a user input acknowledging (and ignoring) the vulnerability or a user input acknowledging and indicating the vulnerability has been fixed, and the like. The vulnerability management system 110 may determine whether any finding record in the finding data structure associated with a new scanner data or any analytic record (e.g., a third type of analytic record) matches a record in the justification data structure. In the case of a match, the vulnerability management system 110 may generate a trend record and determine a trend status for the trend record as manually mitigated. The vulnerability management system 110 may (or may not) continue processing finding data for the key value associated with the manually mitigated trend record (thereby avoiding additional processing of analytics). In some cases, a scanner 125 may indicate that a finding has been manually mitigated, and the vulnerability management system 110 may map the scanner status to a trend status and/or the justification data structure. In this manner, manually mitigated vulnerabilities may be tracked and reported, even if a scanner 125 still reports a finding indicating the vulnerability.

In some cases, to determine a trend status as still manually mitigated, the vulnerability management system 110 may proceed as in the manually mitigated case but also determine whether a prior trend record in the trend data structure matches the trend record generated for the current scanner data. In the case the (new) trend record matches the prior trend record (e.g., same trend status, asset ID, vulnerability ID, and/or key value, but not trend date), the vulnerability management system 110 may update the trend status (of the new trend record) to still manually mitigated.

In some cases, to determine a trend status as discovered and mitigated, the vulnerability management system 110 may determine whether an analytic record of a newest scan key value matches an analytic record of a previous scan key value. In the case that the analytic record of the newest scan key value does not match any analytic record of a previous scan key value and the scanner data indicates the vulnerability has been mitigated, the vulnerability management system 110 may generate a trend record and determine a trend status for the trend record as discovered and mitigated In some cases, certain scanners 125 may detect and cause a vulnerability to be mitigated, and indicate the same in the scanner data. In some cases, certain scanners 125 may scan the organization 115 multiple times before outputting a scanner data set, such that the scanner 125 may discover a vulnerability; (later before outputting the scanner data) not detect the vulnerability; and determine the vulnerability has been mitigated. In this manner, vulnerabilities may be tracked and reported, even if mitigated.

In some cases, a first scanner 125 may report (e.g., at a first time) a finding for the vulnerability, and a second scanner 125 may report (e.g., at second time later than the first time) that the vulnerability is not present (e.g., by absence of the vulnerability in the findings). In this case, if the scanners 125 report the vulnerability (in a first scanner data) and absence (e.g., by not including it in a second scanner data), the vulnerability management system 110 may determine the trend status as discovered and mitigated (e.g., if the first time and second time are within a threshold period of time, such as a same date) or determine the trend status as discovered (on the first time on a first date, as indicated by the first scanner 125), active (if applicable, on an intermediate date between the first date and a second date for the second time), and scan mitigated (on the second date, as indicated by the second scanner 125). In this manner, the vulnerability management system 110 may reduce false positives (e.g., by reporting of a vulnerability that has already been mitigated).

In some cases, a first scanner 125 may not cause a status of a vulnerability detected by a second scanner 125 to be mitigated. In this case, the trend status of the vulnerability indicated by the first scanner 125 may only be changed to scan mitigated by the first scanner 125 or by a manual mitigation indication. In this manner, the vulnerability management system 110 may reduce false negatives, by reporting on a potential vulnerability, so that the potential vulnerability may be examined and confirmed, e.g., by a user.

In some cases, the vulnerability management system 110 may receive new scanner data from a second scanner 125 different from a first scanner 125 that provided previous scanner data (e.g., on a same day or different day). The vulnerability management system 110 may determine an asset of a finding in the new scanner data is a duplicate of an existing asset (with finding data of the previous scanner data); and merge findings, thereby ensuring consistency. For instance, the vulnerability management system 110 may determine the asset IDs, vulnerability IDs, and the key values for each finding match, and merge the new finding of the new scanner data from the second scanner 125 with the previous finding of the previous scanner data from the first scanner 125.

In some cases, the vulnerability management system 110 may perform vulnerability management actions using the at least one analytic data structure (e.g., the third analytic data structure), the finding data structure, and/or the trend data structure. For instance, the vulnerability management system 110 may perform one or combinations of: (1) transmit an alert to a defined endpoint for an asset indicated to have an active or discovered vulnerability (e.g., in accordance with an action rule for a group the asset belongs), (2) flag the group on login, (3) generate external ticket(s) and assign based on the group, (4) generate report(s) based on the group, and/or (5) trigger one or more automation rules based on the group. The vulnerability management system 110 may also update various graphics and/or statistics on various GUI for the user to view. For instance, in some cases, the vulnerability management system 110 may cause the indication of the change in the vulnerability status from the first time period to the second time period to be displayed to a user, thereby depicting a trend status (or metrics based thereon) to a user for corresponding assets (or groups, projects, or the organization 115 and the like).

Vulnerability Management System

Figure 3:
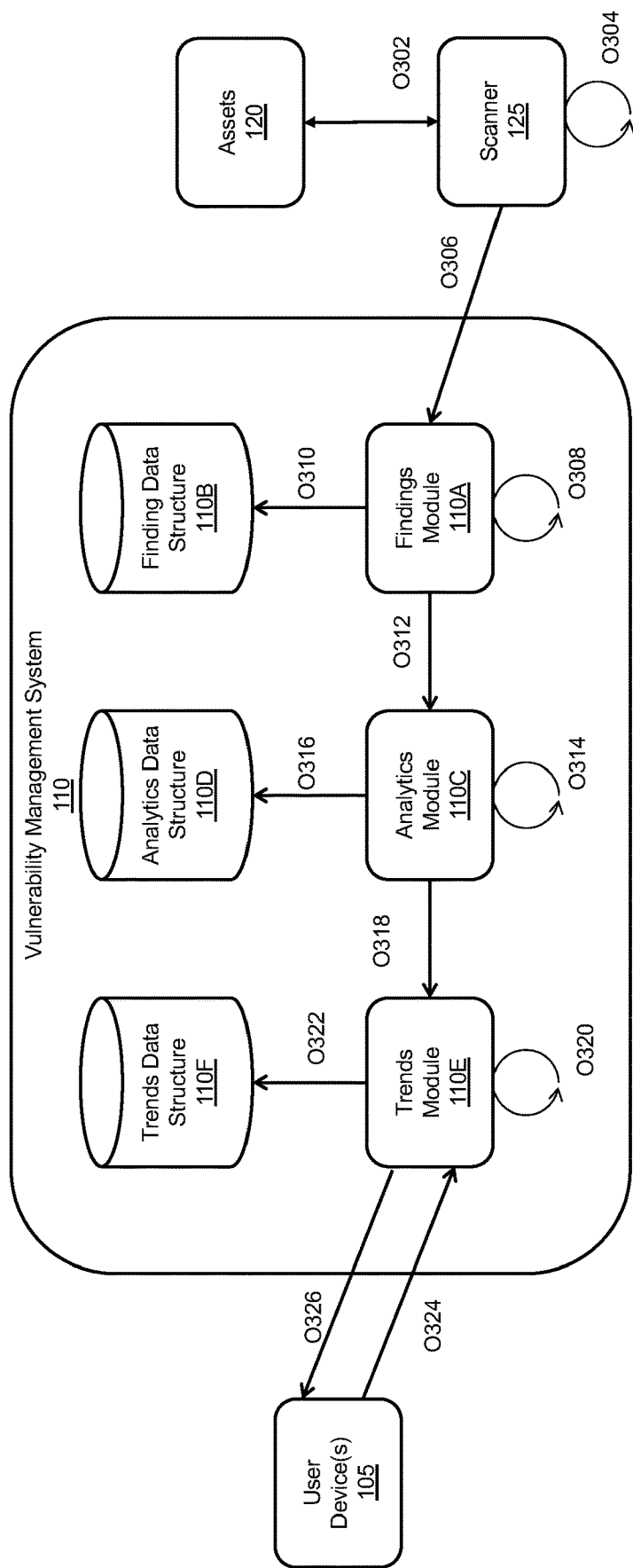
FIG. 3 depicts a block diagram depicting vulnerability detection and management in IT systems based on scan results.

FIG. 3 depicts a block diagram 300 depicting vulnerability management system 110 interacting with components of IT systems based on scan results.

Diagram 300 depicts operations O302 through O326. Diagram 300 depicting vulnerability management system 110 interacting with components of IT systems based on scan results may apply to features of FIGS. 1, 2, 4A-4B, 5A-5B, 6A-6F, 7, and 8. The vulnerability management system 110 may include findings module 110A, finding data structure 110B, analytics module 110C, analytics data structure 110D, trends module 110E, and trends data structure 110F. The operations O302 through O326 may include:

In operation O302, operation O302 may include the scanner 125 obtaining raw data about the plurality of assets 120 (or subsets thereof) of the organization 115. In some cases, the scanner 125 may obtain the raw data about the assets at a set interval (e.g., every day), in response to user request via user device 105, or in response to a new vulnerability being discovered (e.g., reported and classified) so as to scan for the new vulnerability.

In operation O304, operation O304 may include the scanner 125 processing the raw data about the plurality of assets (or subsets thereof) to generate scanner data. For instance, the scanner 125 may generate the scanner data based on analyzing the raw data about the plurality of assets 120 (or subsets thereof) to determine vulnerabilities on specific assets of the plurality of assets 120.

In operation O306, operation O306 may include the scanner 125 transmitting the scanner data to the findings module 110A. For instance, the scanner 125 may transmit the scanner data at set intervals or in response to a request from the findings module 110A.

In operation O308, operation O308 may include the findings module 110A determining a plurality of finding records based on the scanner data. For instance, the findings module 110A may determine an asset ID, vulnerability ID, and key value for each finding and generate a finding record for each finding.

In operation O310, operation O310 may include the findings module 110A storing the plurality of finding records in the finding data structure 110B.

In operation O312, operation O312 may include the findings module 110A transmitting an instruction to the analytics module 110C, to thereby trigger analytics processing.

In operation O314, operation O314 may include the analytics module 110C determining a plurality of analytics records based on the finding records and/or scanner data. For instance, the analytics module 110C may determine a scan key value and/or scan metrics, and generate relevant analytic records to store the analytics data in appropriate data structures, such as the analytics data structure 110D.

In operation O316, operation O316 may include the analytics module 110C storing the plurality of analytics records in the analytics data structure 110D.

In operation O318, operation O318 may include the analytics module 110C transmitting an instruction to the trends module 110E, to thereby trigger trends processing.

In operation O320, operation O320 may include the trends module 110E determining a plurality of trend records. For instance, the trends module 110E may determine changes in vulnerability status of assets over time, and generate trend records for the changes in the vulnerability status.

In operation O322, operation O322 may include the trends module 110E storing the plurality of trend records in the trends data structure 110F.

In operation O324, operation O324 may include the user device 105 transmitting asset group rules, vulnerability management action rules, and the like, to the trends module 110E. In this manner, the trends module 110E may group assets and perform vulnerability management actions in response to detecting a vulnerability on an asset, as discussed herein.

In operation O326, operation O326 may include the trends module 110E performing vulnerability management actions in response to detecting a vulnerability on an asset (s). For instance, the trends module 110E may detect a vulnerability for an asset of a group (e.g., in a finding record, an analytic record, or in a trend record), determine a vulnerability management action based on the group, and perform the vulnerability management action (e.g., display or transmit data about the vulnerability).

Determining and Managing Records in Vulnerability Management System

Figure 4A:
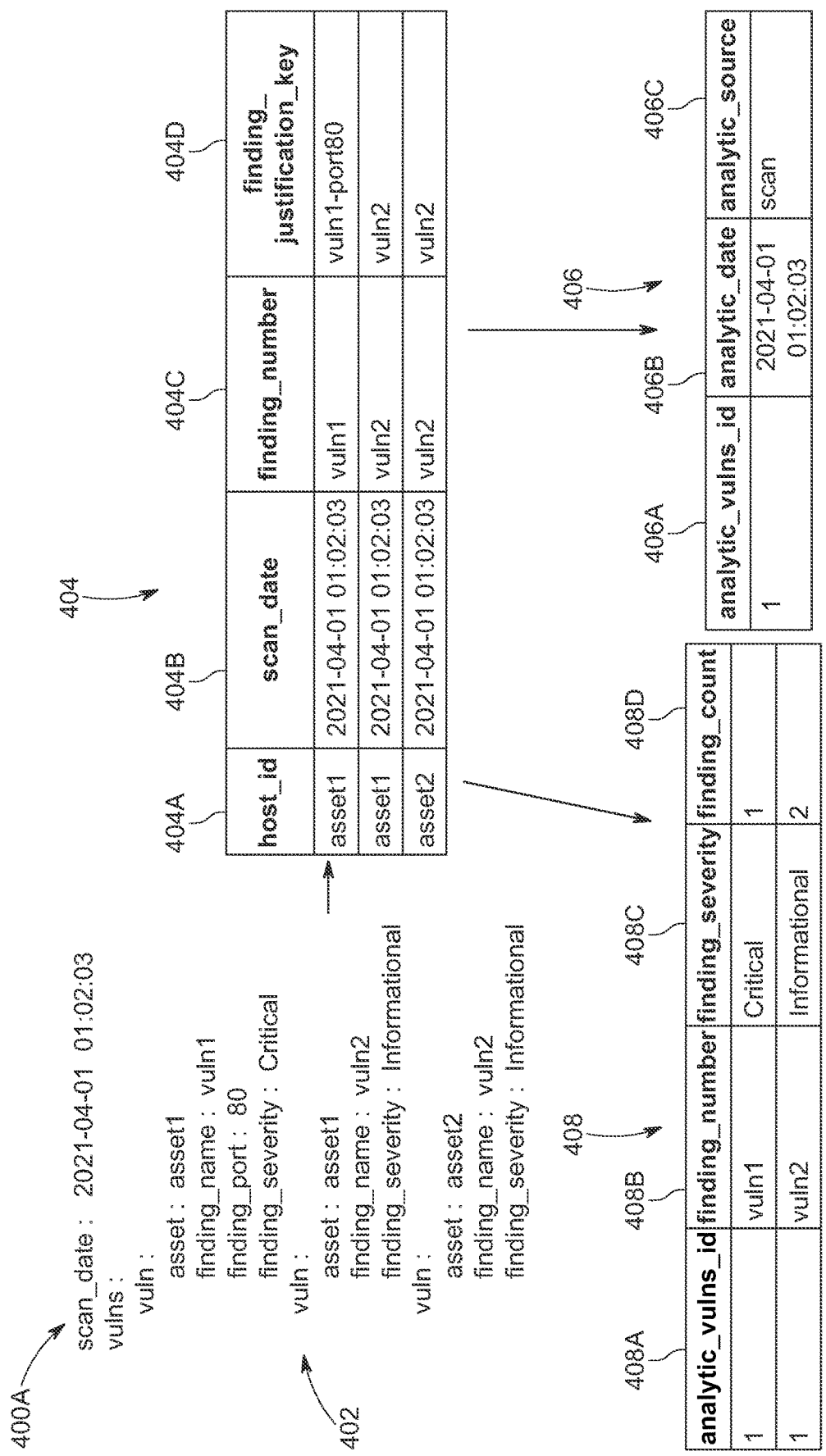
FIGS. 4A-4B and 5A-5B depict a vulnerability management system determining and managing records for vulnerability detection and management in IT systems.
Figure 4B:
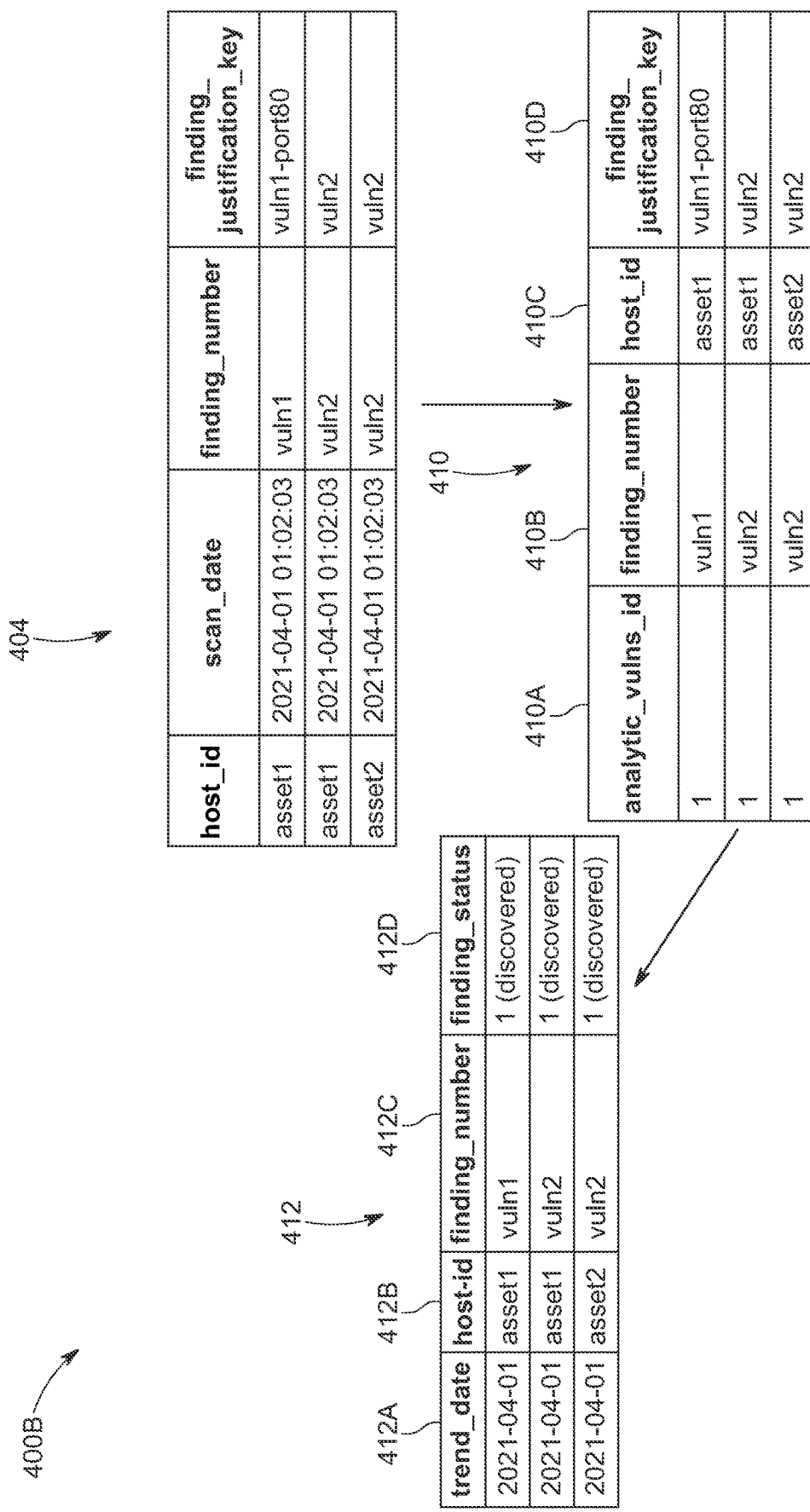
Figure 5A:
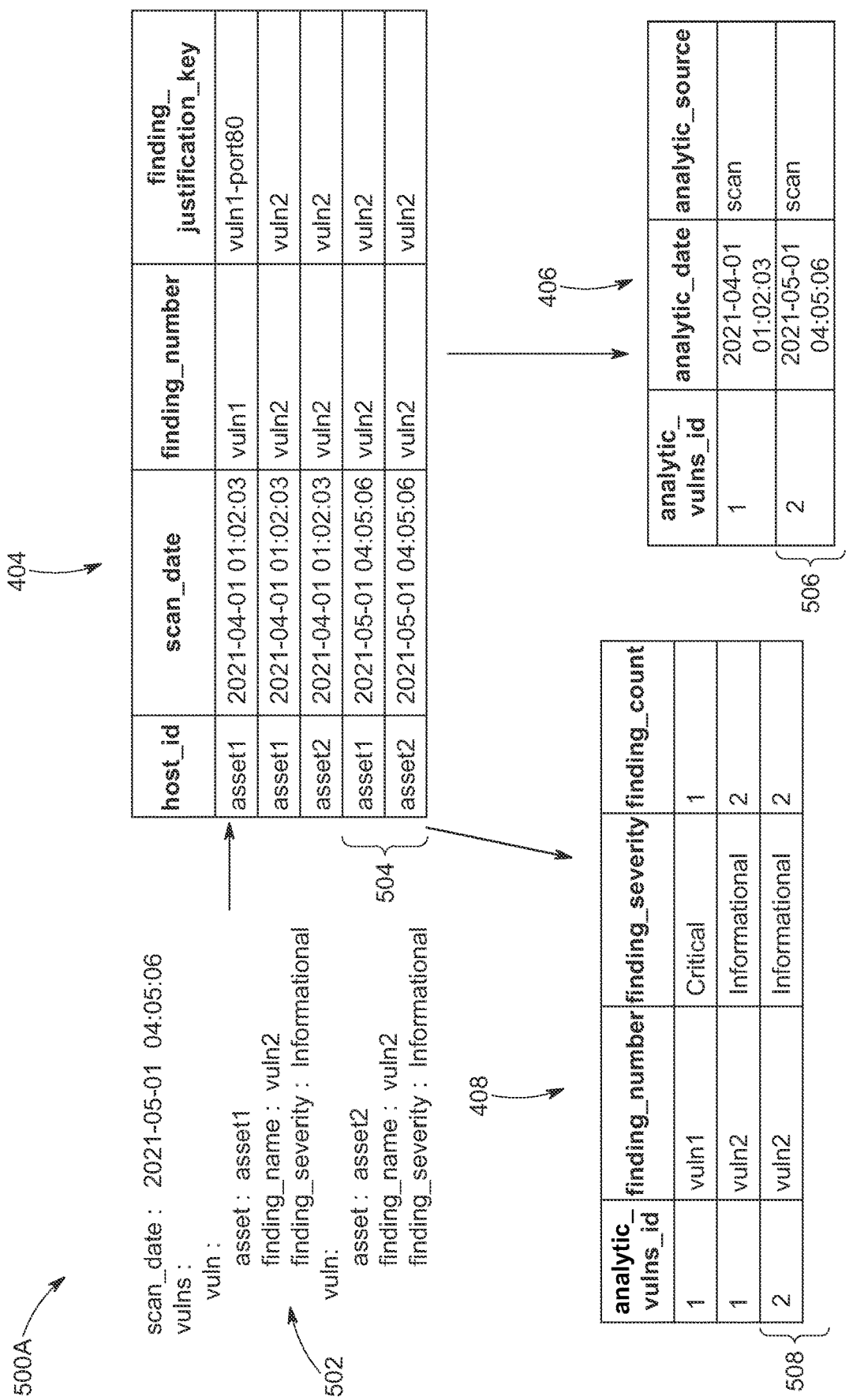
Figure 5B:
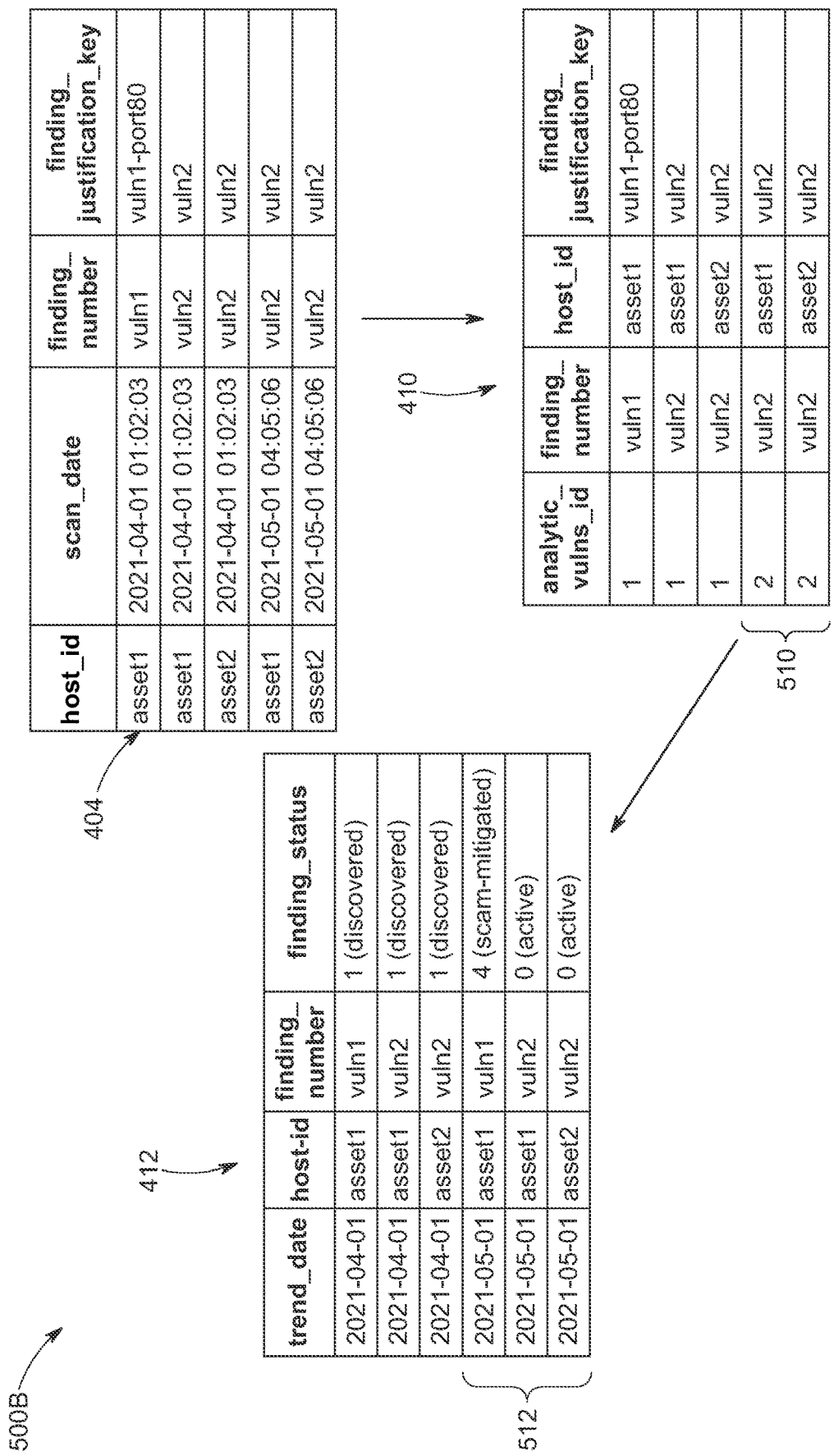
Figure 6A:
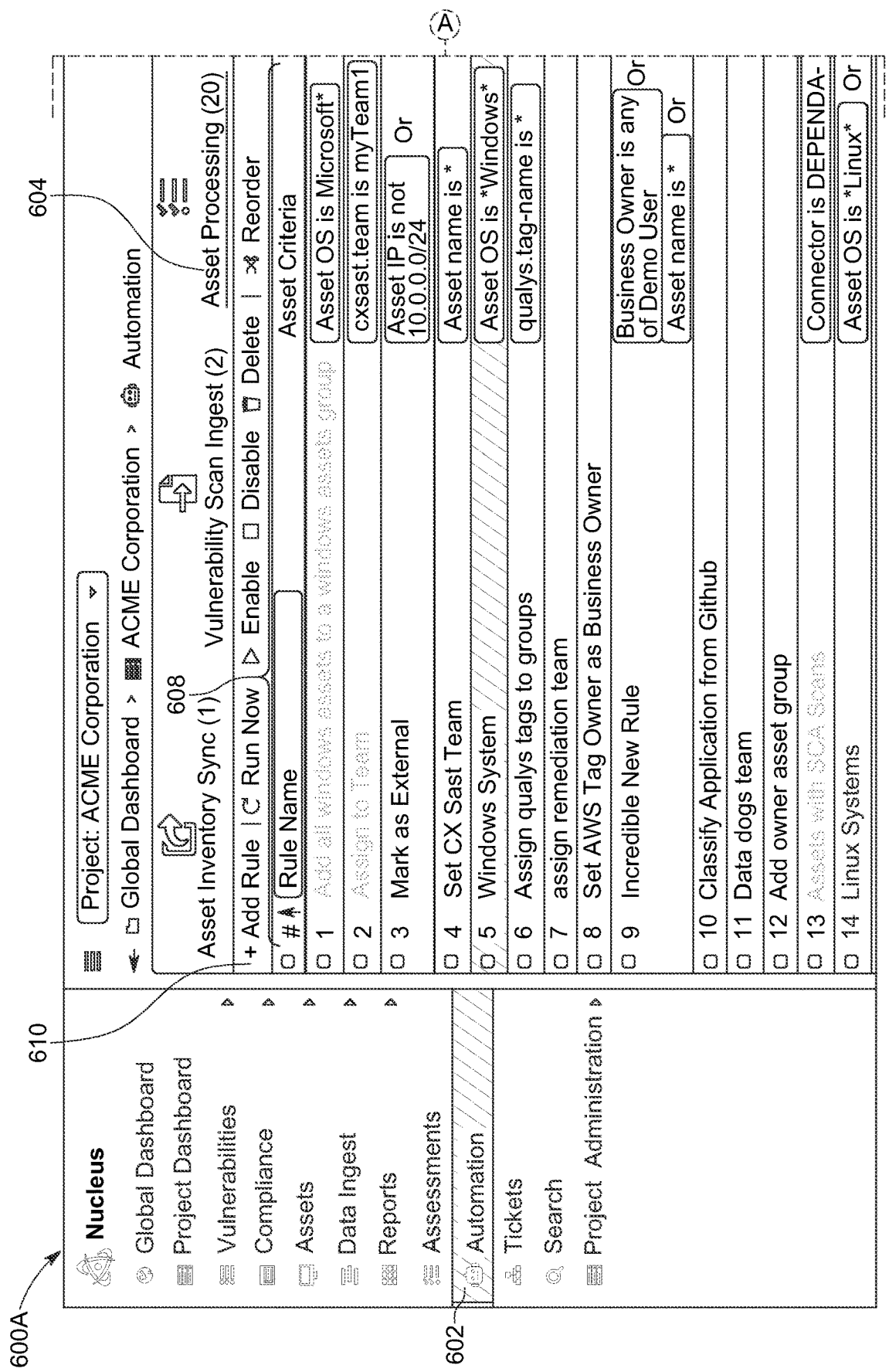
Figure 6C:
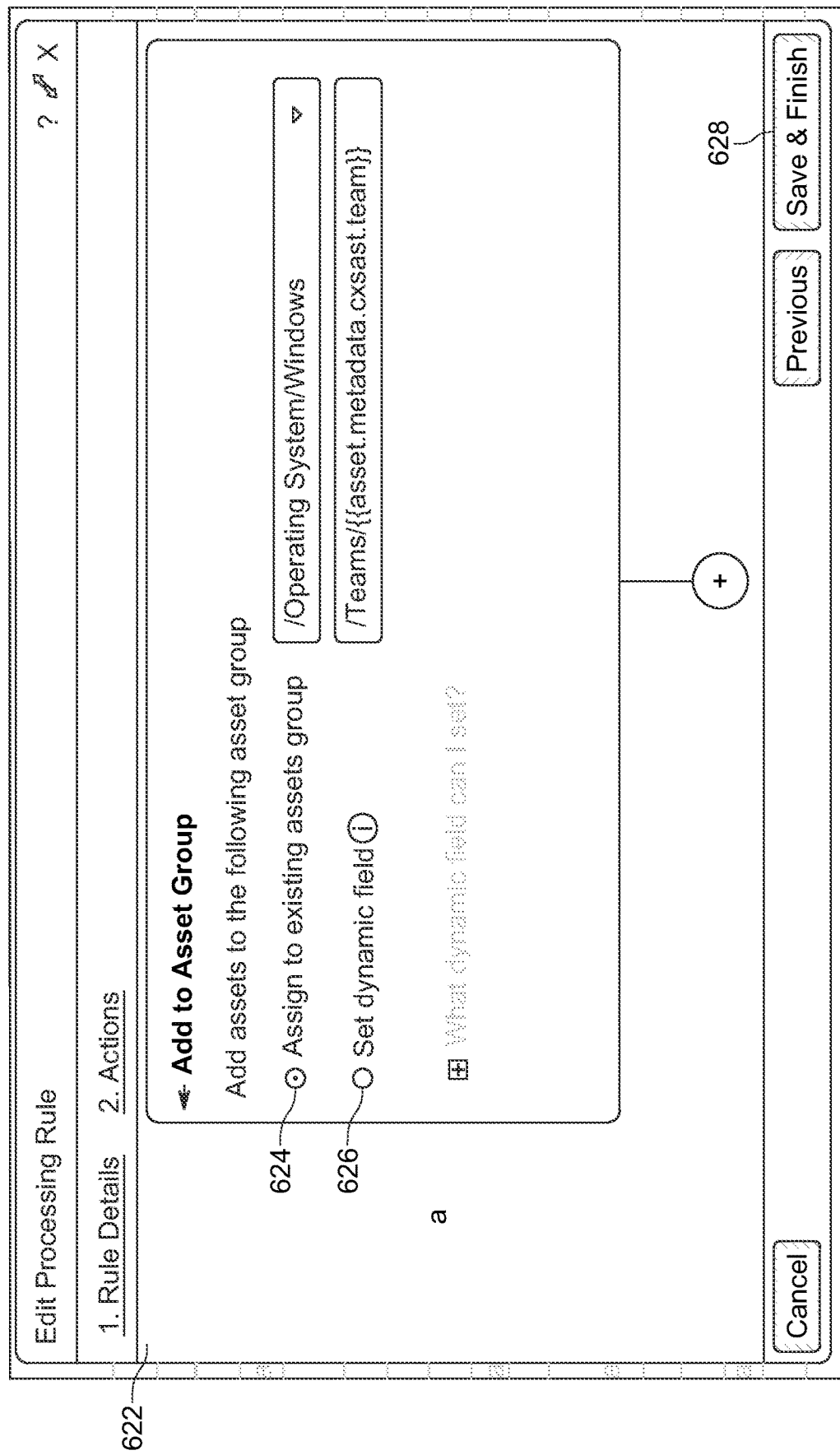
Figure 6D:
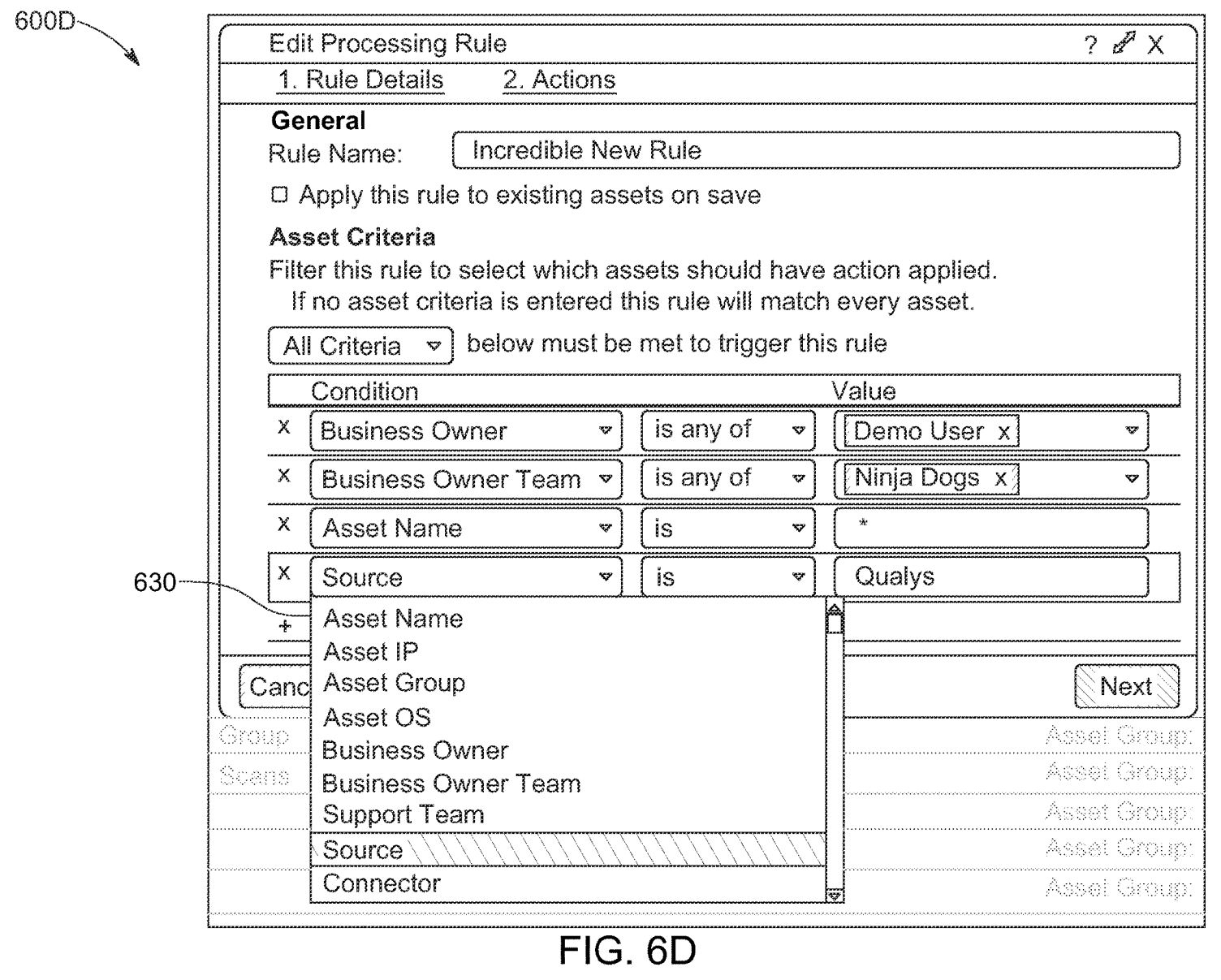
Figure 6E:
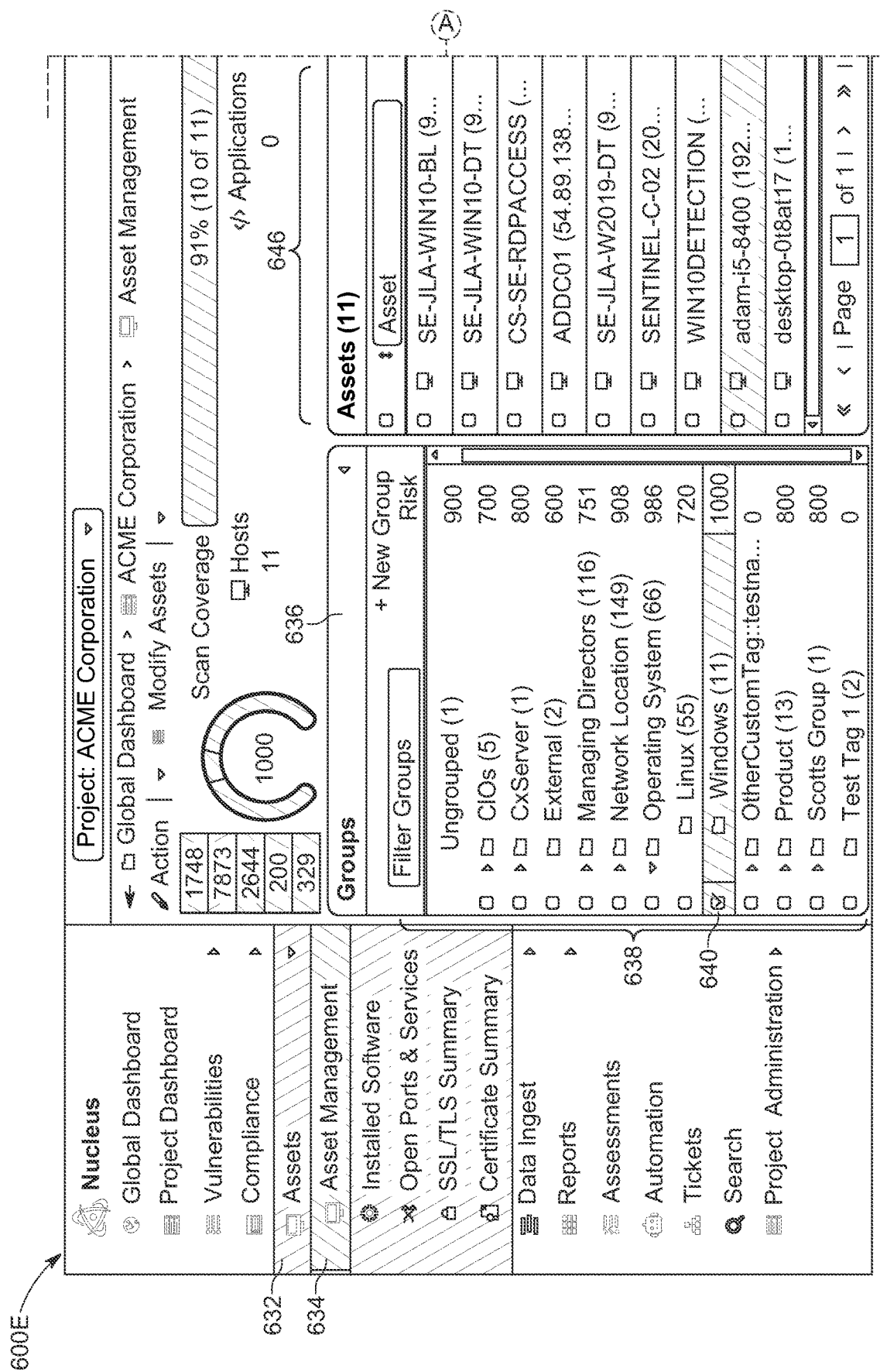
Figure 6E:
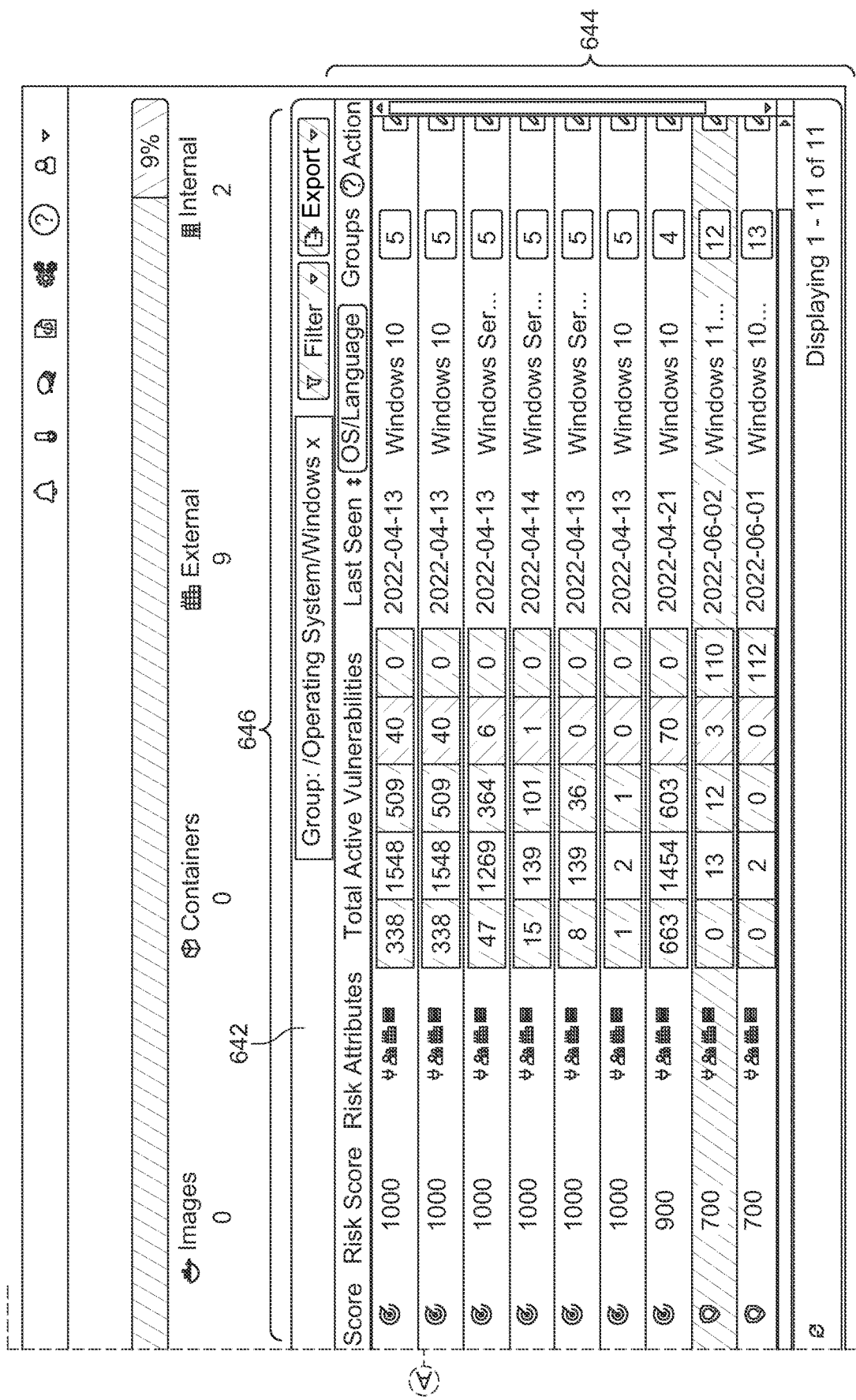
Figure 6F:
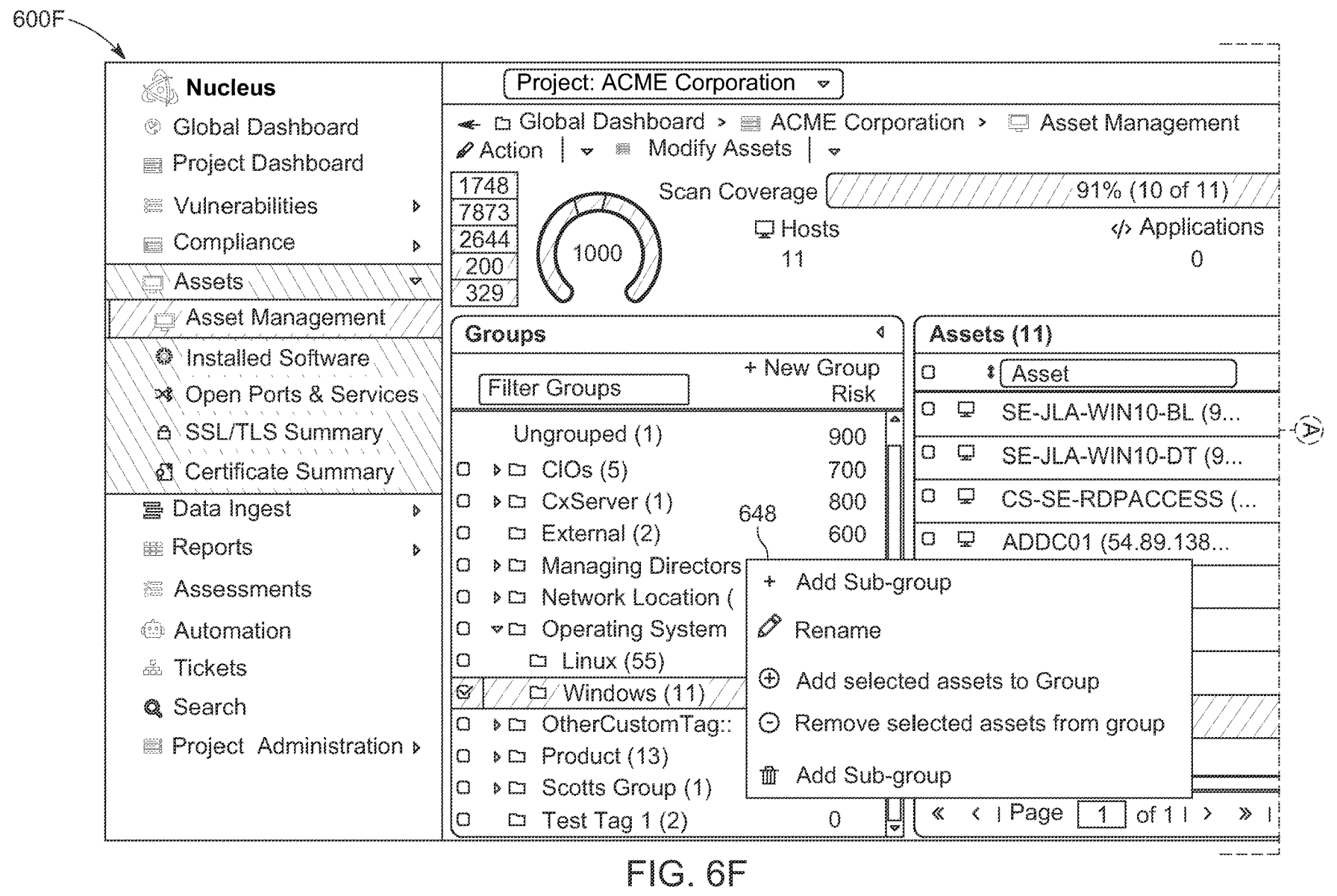

FIGS. 4A-4B and 5A-5B depict diagram 400A, diagram 400B, diagram 500A, and 500B of a vulnerability management system 110 determining and managing records for vulnerability detection and management in IT systems. The vulnerability management system 110 determining and managing records for vulnerability detection and management in IT systems in FIGS. 4A-4B and 5A-5B may apply to features of FIGS. 1, 2, 3, 6A-6F, 7, and 8. FIGS. 4A-4B may depict the vulnerability management system 110 processing a first scanner data 402 at a first time (e.g., first date), while FIGS. 5A-5B may depict the vulnerability management system 110 processing a second scanner data 502 at a second time (e.g., a second date later than the first date).

The vulnerability management system 110 may generate a first set of finding records based on the first scanner data 402, and populate the first set of finding records in a findings table 404. The findings tables 404 may have columns for asset ID 404A, scan date 404B, vulnerability ID 404C, and key value 404D, and rows to store values for each finding record.

The vulnerability management system 110 may generate a first scan key value to differentiate a scan event for first scanner data 402 and generate first scan metrics for first scanner data 402, as discussed herein. The vulnerability management system 110 may then generate a first plurality of analytic records and store the first plurality of analytic records in respective analytic tables. For instance, the vulnerability management system 110 may store a first type of analytic record in a first analytic table 406; store a second type of analytic record in a second analytic table 408; and store a third type of analytic record in a third analytic table 410. The first analytic table 406 may have columns for scan key value 406A, scan date 406B, and source of scanner data 406C, and rows to store values for each first type of analytic record. In some cases, the first analytic table 406 may also have columns for roll-up metadata about analytics, such as total and/or unique number of findings, total and/or unique number of findings at various severities, and the like. The second analytic table 408 may have columns for scan key value 408A, vulnerability ID 408B, severity level 408C, and scan metrics 408D, and rows to store values for each second type of analytic record. In some cases, the second analytic table 408 may also have columns for additional metadata about analytics, such as roll-up numbers from the third analytic table 410. The third analytic table 410 may have columns for scan key value 410A, vulnerability ID 410B, asset ID 410C, and key value 410D, and rows to store values for each third type of analytic record.

The vulnerability management system 110 may generate a first plurality of trend records based on at least records in the findings table 404 and/or the third analytic table 410. The vulnerability management system 110 may store the trend records in a trend table 412. The trend table 412 may have columns for trend date 412A, asset ID 412B, vulnerability ID 412C (or key value), and trend status 412D, and rows to store values for each trend record.

The vulnerability management system 110 may perform vulnerability management actions using the third analytic table 410, the findings table 404, and/or the trend table 412, as updated after (or during) processing of the first scanner data 402. For instance, when a finding record is added to the findings table 404 or a trend status is determined, the vulnerability management system 110 may update a display of vulnerability data or trend status for the asset, transmit alerts for the asset and/or group the asset belongs to, and the like, as discussed herein.

Subsequently, the vulnerability management system 110 may receive the second scanner data 502. The vulnerability management system 110 may generate a second set of finding records 504 based on the second scanner data 502 and populate the second set of finding records 504 in the findings table 404.

The vulnerability management system 110 may generate a second scan key value to differentiate a scan event for second scanner data 502 and generate second scan metrics for the second scanner data 502, as discussed herein. The vulnerability management system 110 may then generate a second plurality of analytic records and store the second plurality of analytic records in respective analytic tables. For instance, the vulnerability management system 110 may store a first type of analytic record 506 for the second scanner data in the first analytic table 406; store a second type of analytic record 508 in the second analytic table 408; and store a plurality of third type of analytic records 510 in the third analytic table 410.

The vulnerability management system 110 may generate a second plurality of trend records 512 based on at least records in the findings table 404 and/or the third analytic table 410. The vulnerability management system 110 may store the second plurality of trend records 512 in the trend table 412.

The vulnerability management system 110 may perform vulnerability management actions using the third analytic table 410, the findings table 404, and/or the trend table 412, as updated after (or during) processing of the second scanner data 502. For instance, when a finding record is added to the findings table 404 or a trend status is determined, the vulnerability management system 110 may update a display of vulnerability data or trend status for the asset, transmit alerts for the asset and/or group the asset belongs to, and the like, as discussed herein.

Graphical User Interfaces for Vulnerability Management System

FIGS. 6A-6F depict GUIs 600A-600F for vulnerability detection and management. The GUIs 600A-600F for vulnerability detection and management may apply to features of FIGS. 1, 2, 3, 4A-4B, 5A-5B, 7, and 8.

In GUI 600A, GUI 600A may depict an automation user interface 602 (e.g., displayed on a user device 105 in response to data provided from the vulnerability management system 110). The automation user interface 602 may include various sections (not depicted), such as asset inventory sync section for asset inventory sync rules, vulnerability scan ingest section for vulnerability scan ingest rules, finding processing section for finding processing rules, ticketing and issue tracking section for ticketing and issue tracking rules, notification section for notification rules, asset removal section for asset removal rules, asset ignore section for asset ignore rules, and the like. A currently displayed section of the automation user interface 602 may be an asset processing section 604 for asset processing rules. For instance, active asset grouping rules 606 may be displayed in the asset processing section 604, with various columns 608 of data for the asset grouping rules, such as name, condition, action, and the like. The asset processing section 604 may also include an add rule element 610. The add rule element 610 may be selectable by a user input to generate a new asset grouping rule.

In GUI 600B, GUI 600B may depict processing rule interface 612 in response to a user input selecting the add rule element 610. The processing rule interface 612 may have a name input field 614, a first condition element 616, and a second condition element 618. The name input field 614 may receive user inputs (e.g., alphanumeric text) to name a grouping rule. The first condition element 616 may be a selector to define a logical operator on conditions set by the second condition element 618. The second condition element 618 may be user selectable to define conditions on values of attributes of assets. The processing rule interface 612 may include a continue element 620. The continue element 620 may be user selectable by a user input to continue to an action interface 622

In GUI 600C, GUI 600C may depict the action interface 622 in response to a user input on the continue element 620. The action interface 622 may include a first action element 624 and a second action element 626. The first action element 624 may be user selectable to define an asset group (e.g., from a selection window of existing asset groups) to add an asset that satisfies the logical operator and conditions set by the second condition element 618. The second action element 626 may be user selectable to map a data bit of an asset to a dynamic field. If a user configures the second action element 626, the vulnerability management system 110 may extract data (e.g., a piece of metadata) for the asset and generate a dynamic field for the asset. In some cases, the vulnerability management system 110 may pass the dynamic field (populated with the extracted data) to a process rule. The process rule may be system defined or user defined so as to perform certain actions based on the value of the dynamic field. For instance, a process rule could generate a new group for the value of the dynamic field or add an asset to an already existing group for the value of the dynamic field. As an example, the second action element 626 may enable a user to pull metadata from the asset and dynamically apply the metadata to a host group. In particular, if a first asset had metadata businessPerson set to person1, then a process rule could add the first asset to a group based on "businessperson," and the asset could be assigned to a group called "person1." For instance, if the first time "businessperson" is set to person1, the vulnerability management system 110 may generate the group called "person1" and assign the first asset to the group called "person 1." Similarly, if a second asset had metadata businessperson set to person2, the process rule could add the second asset to a group called "person2." Similarly, if a third asset had metadata businessperson set to person1, the process rule could add the third asset to the group called "person1." The action interface 622 may include a save and finish element 628. The save and finish element 628 may be user selectable to finish the asset grouping rule. For instance, the user device 105 may transmit the new asset grouping rule to the vulnerability management system 110 in response to a user input selecting the save and finish element 628.

In GUI 600D, GUI 600D may depict a more complex asset grouping rule and a selection menu element 630. The selection menu element 630 may display different attributes of assets to form conditions. The conditions may include a logical expression on a value of an attribute, a logical operator (is, is not, is any of, and the like), and a conditional value (e.g., a threshold, a name, an ID, and the like).

In GUI 600E, GUI 600E may depict an assets interface 632. The assets interface 632 may be displayed in response a user selecting the assets interface 632 or in response to user input selecting the save and finish element 628 (e.g., user device 105 transmitting the new asset grouping rule to the vulnerability management system 110, which may process it (e.g., validate the new asset grouping rule), associate assets to groups based on the new asset grouping rule, and transmit data (e.g., webpage or application interface) back to the user device 105). The assets interface 632 may have several sections, including (not depicted) an installed software section, an open ports and service section, SSL/TLS summary section, and a certificate summary section. A currently displayed section of the assets interface 632 may be an asset management section 634 for displaying groups and assets in those groups, along with data related thereto. For instance, the groups 638 may be displayed in a group section 636. A group 640 of the groups 638 may be selected (e.g., by a user input) to display assets 644 of the group 640 in asset section 642. Asset section 642 may include various columns 646 of data for each asset in the group 640.

In GUI 600F, GUI 600F may depict a modify interface 648 in response to a user input (e.g., right click) on a group (e.g., group 640) in group section 636. The modify interface 648 may allow a user to perform one or more actions for the group, such as add a sub-group (e.g., generate a new group under the group and inherent aspects of the group), rename the group, delete the group, and/or modify assets in group (e.g., add assets to group, remove assets from group).

Example Routine(s) for Vulnerability Management Systems

Figure 7:
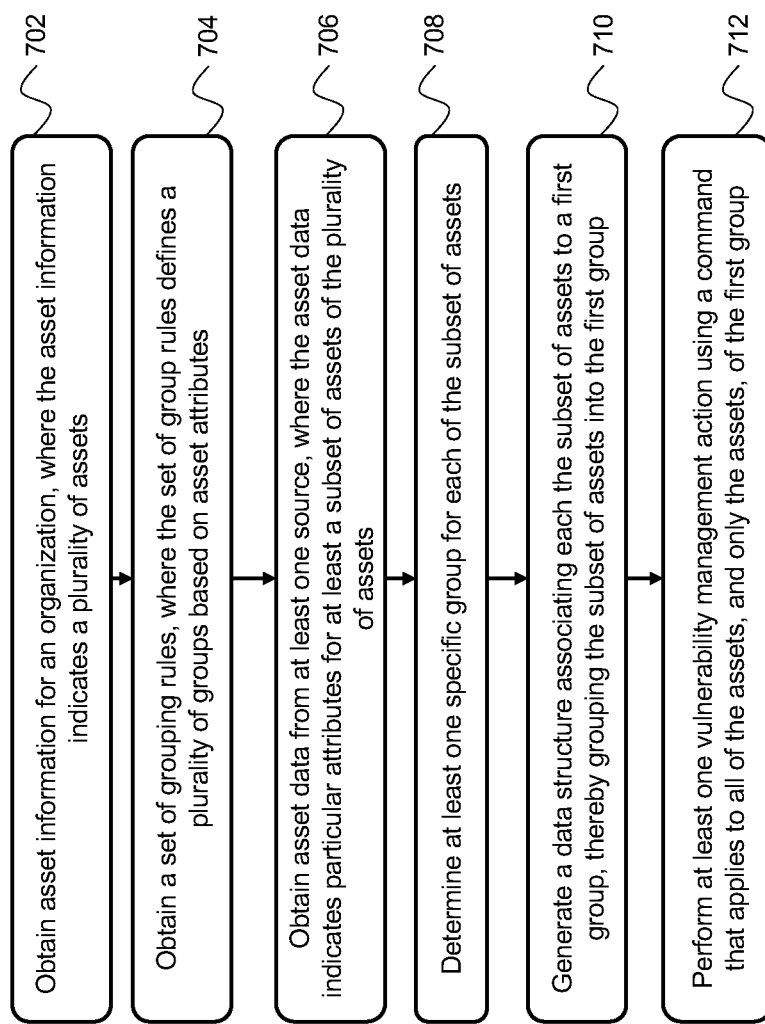
FIG. 7 depicts a flowchart of an exemplary routine for vulnerability detection and management using asset grouping rules.

FIG. 7 depicts a flowchart of an exemplary routine 700 for vulnerability detection and management using asset grouping rules. The routine 700 for vulnerability detection and management using asset grouping rules may apply to features of FIGS. 1, 2, 3, 4A-4B, 5A-5B, 6A-6F, and 8. In the routine 700, the routine 700 may be performed by one or more systems, such as the vulnerability management system 110 and/or at least one scanner 125

The routine 700 may start at block 702, where the vulnerability management system 110 may obtain asset information for an organization, where the asset information indicates a plurality of assets. For instance, the vulnerability management system 110 may receive a list of assets from an asset management service or scanner 125, as discussed herein.

At block 704, the vulnerability management system 110 may obtain a set of grouping rules, where the set of group rules defines a plurality of groups based on asset attributes. For instance, the vulnerability management system 110 may receive user inputs and/or data to define asset grouping rules, as discussed herein.

At block 706, the vulnerability management system 110 may obtain asset data from at least one source, where the asset data indicates particular attributes for at least a subset of assets of the plurality of assets. For instance, the vulnerability management system 110 may obtain the asset metadata for the subset of assets, as discussed herein.

At block 708, the vulnerability management system 110 may determine at least one specific group for each of the subset of assets. For instance, the vulnerability management system 110 may apply asset grouping rules and/or user inputs to group each asset into at least one group, as discussed herein.

At block 710, the vulnerability management system 110 may generate a data structure associating each the subset of assets to a first group, thereby grouping the subset of assets into the first group. For instance, the vulnerability management system 110 may store the association so that vulnerability management action may be determined, as discussed herein.

At block 712, the vulnerability management system 110 may perform at least one vulnerability management action using a command that applies to all of the assets, and only the assets, of the first group. For instance, the vulnerability management system 110 may detect a vulnerability of an asset of the first group and perform a vulnerability management action associated with the first group, as discussed herein. In some cases, the vulnerability management system 110 may perform a vulnerability management action that applies to a higher level group (if the asset is in a nested group). Generally, the vulnerability management system 110 may have a plurality vulnerability management actions that are triggered for different assets and/or groups in accordance with trigger conditions (e.g., asset has vulnerability detected). Some vulnerability management actions may be triggered for specific groups and/or specific assets (e.g., transmit a message to an endpoint associated with that specific group and/or specific asset), while some vulnerability management actions may apply to all assets and/or groups (e.g., displaying data associated therewith), as discussed herein.

Figure 8:
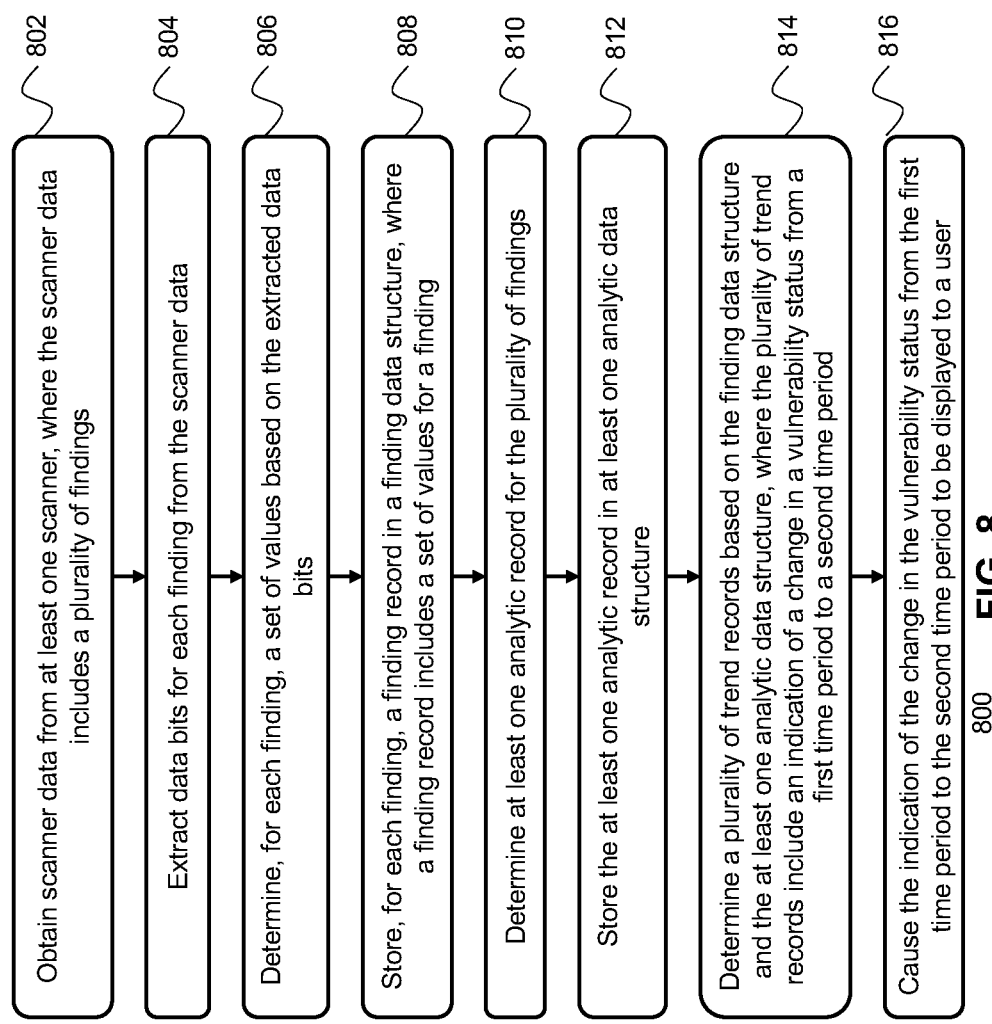
FIG. 8 depicts a flowchart of an exemplary routine for vulnerability detection and management with a determination of trend records.

FIG. 8 depicts a flowchart of an exemplary routine 800 for vulnerability detection and management with a determination of trend records. The routine 800 for vulnerability detection and management with a determination of trend records may apply to features of FIGS. 1, 2, 3, 4A-4B, 5A-5B, 6A-6F, and 7. In the routine 800, the routine 800 may be performed by one or more systems, such as vulnerability management system 110.

The routine 800 may start at block 802, where the vulnerability management system 110 may obtain scanner data from at least one scanner, where the scanner data includes a plurality of findings. For instance, the vulnerability management system 110 may request or periodically receive scanner data from a scanner 125, as discussed herein.

At block 804, the vulnerability management system 110 may extract data bits for each finding from the scanner data. For instance, the vulnerability management system 110 may parse the scanner data using a scanner model and extract the data bits for each finding, as discussed herein.

At block 806, the vulnerability management system 110 may determine, for each finding, a set of values based on the extracted data bits. For instance, the vulnerability management system 110 may determine an asset ID, a vulnerability ID, and a key value, as discussed herein.

At block 808, the vulnerability management system 110 may store, for each finding, a finding record in a finding data structure, where a finding record includes a set of values for a finding. For instance, the vulnerability management system 110 may store finding records for the scanner data for storage, analytics, and vulnerability management actions, as discussed herein.

At block 810, the vulnerability management system 110 may determine at least one analytic record for the plurality of findings. For instance, the vulnerability management system 110 may determine a scan key value and scan metrics, and generate a first type of analytic record, one or more second type of analytic records, and one or more third type of analytic records, as discussed herein.

At block 812, the vulnerability management system 110 may store the at least one analytic record in at least one analytic data structure. For instance, the vulnerability management system 110 may store the analytic records for storage, analytics, and vulnerability management actions, as discussed herein.

At block 814, the vulnerability management system 110 may determine a plurality of trend records based on the finding data structure and the at least one analytic data structure, where the plurality of trend records include an indication of a change in a vulnerability status from a first time period to a second time period. For instance, the vulnerability management system 110 may determine trend statuses based on analytic records and finding records, and generate trend records for the trend statuses and corresponding vulnerabilities (e.g., vulnerability ID, key value, and asset ID), as discussed herein.

At block 816, the vulnerability management system 110 may cause the indication of the change in the vulnerability status from the first time period to the second time period to be displayed to a user. For instance, the vulnerability management system 110 may update data in a user interface, transmit an alert, and the like, as discussed herein.

Container Image Deduplication

Figure 9:
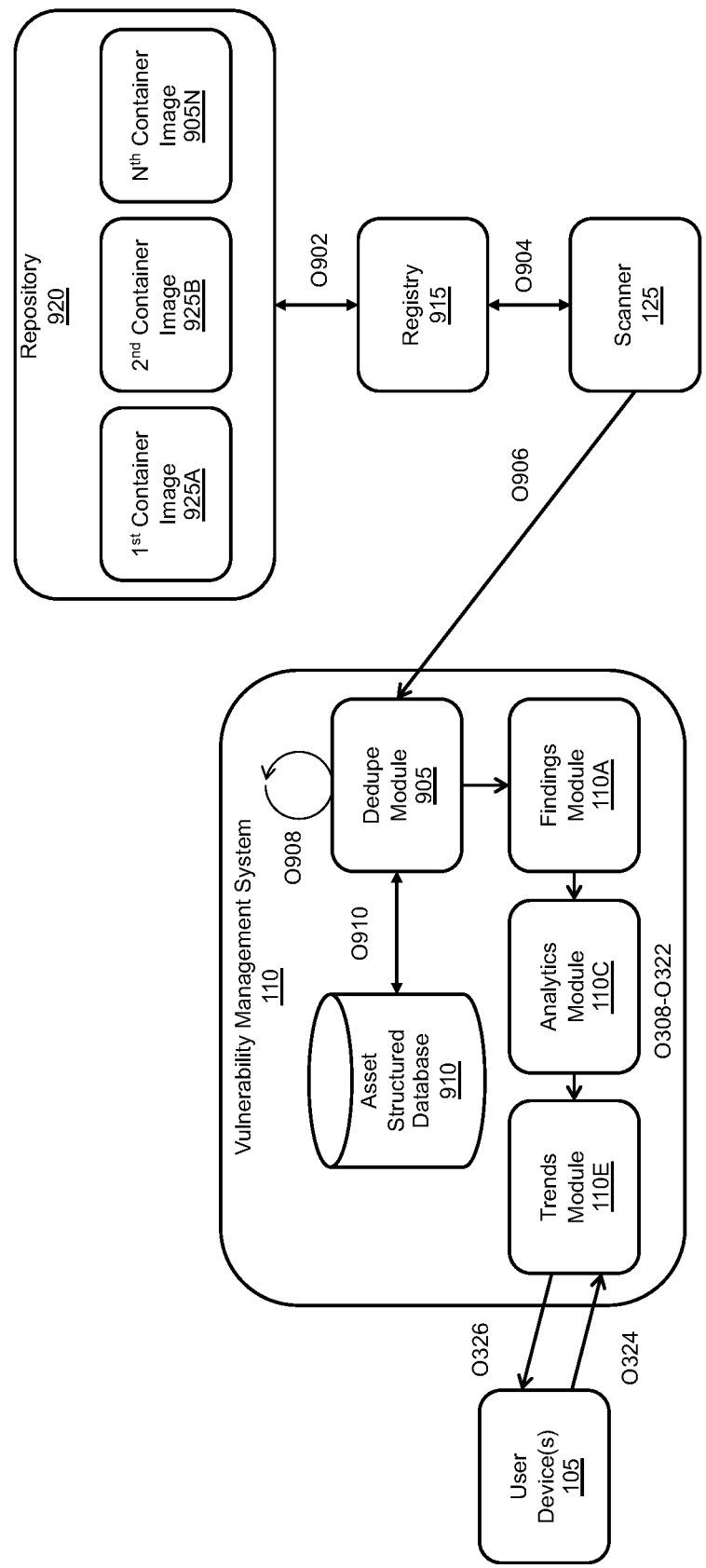
FIG. 9 depicts a depicts a block diagram for container image deduplication for a vulnerability management system.

FIG. 9 depicts a depicts a block diagram 900 for container image deduplication for a vulnerability management system 110. Diagram 900 depicts operations O902 through O910 in context of operations O308 through O326 of diagram 300. Diagram 900 depicting container image deduplication may apply to features of FIGS. 1, 2, 3, 4A-4B, 5A-5B, 6A-6F, 7, and 8. In this case, the vulnerability management system 110 may include the findings module 110A, the finding data structure 110B (not shown), the analytics module 110C, the analytics data structure 110D (not shown), the trends module 110E, the trends data structure 110F (not shown), a deduplication module 905, and an asset structured database 910. The diagram 900 also depicts one or more of the following: a repository 920 comprising one or more container images (first container image 925A, second container image 925B, and up to an $n^{th}$ container image 905N); a registry 915 (in some cases, one or more registries as described herein); a scanner 125; and/or a user device 105, each of which may be described further below.

In operation O902, information regarding assets and/or findings may be obtained from a variety of sources. A container image may be a type of asset and the system may track a findings (or not) for that container image. A container may be a virtual machine (VM) capable of operating on a system and a container image may be a static image, or in other words a snapshot, of the VM. In some cases, generating a container may involve a developer using the VM (a specifically configured OS) as a base and adding code ("developer-defined code") to run a defined software process. The combination of the VM-base and the developer-defined code may be referred to as a container, such that the container is self-contained software package to run on its own compute instance, environment, VM, hypervisor, or a server (e.g., a cloud server). A container image may be a snapshot (e.g., an entire copy or compressed version of a container) or an abstracted packet defined to be compiled with a VM-base to form a container when deployed. Code used to program the container (e.g., the VM-base and/or the developer-defined code) may contain one or more vulnerabilities and identifying and keeping track of the status of the vulnerabilities for each respective container/container image may be desirable.

In some cases, container images may be content addressable. A content addressable container image may be identified by a unique hash (herein referred to as a container image ID). The container image ID may be a hash of a configuration file for the container image (for example, a SHA-256 hash of the configuration that described the container image). For example, two different container images may always be associated with two different container image IDs. In some cases, the hashes may be SHA-256 hashes.

The container may additionally be tagged. In some cases, such tags may be immutable (e.g., cannot be altered). In some cases, the tags may be mutable (e.g., the registry 915 that hosts the images may allow for them to be changed). For a given repository 920, each container image may be associated with a unique tag. For example, if image 1 has tag "version 1.2.3", then no other images in the repository 920 where image 1 is stored can have tag "version 1.2.3" (say for example image 2 was retagged to tag "version 1.2.3"; in such a case, image 1 will lose tag "version 1.2.3"). In some cases, the tag name may be assigned "latest" to mark that this container image is the latest version of this image stored in this repository 920 hosted on this registry 915. In some cases, the same image that is built for different architectures (one that is built to run on a Linux OS configured to use a first CPU and another that is built to run on a Mac OS configured to use a second CPU) may have the same tag since they represent the same entity. In such a case, while the container image IDs and container image digests (described in operation O904) of the images may be different, the tags may be identical. As described with respect to operations O908 and O910, the hashes and tags may be individually used during the matching process to find a match between a result from a scanner asset (e.g., containing information regarding a yet-to-be-determined container image) and an existing container image.

The repository 920 may be a logical construct linked to the system 110 that may contain a collection and/or a grouping of one or more containers images (for example, as shown, the grouping may be the $1^{st}$ container image 925A, the $2^{nd}$ container image 925B . . . up to $n^{th}$ container image 905N). In some cases, the same image may be included in two different repositories, for example, when the repositories are hosted on a public platform (such as a registry 915) and the images are able to be downloaded, described further herein. The system 110 may be linked to multiple repositories and each repository 920 may be associated with a respective repository identifier (such as a repository name). Assets (container images) may only be considered the same if they are stored on the same repository 920. For example, identical images stored at a first repository and a second repository may not be considered the same asset. Additionally, a repository 920 may hold multiple versions of an image (e.g., a developer pushes out updates of the image). In some cases, each version may be considered a different asset (different container image). Such information may be used when determining whether a match has been identified (in other words whether an asset in question is unique or not), as described herein. As described with respect to the matching process, the repository identifier may be used during a first step by the system 110 when attempting to match a new asset with container images already existing in the database 910. In some cases, the system 110 may reject a new asset from being processed by the deduplication module 905 if the source that provided data conveying the new asset failed to include a repository identifier. In such a case, a message may be sent (for example, to a user) requesting a repository identifier for the new asset.

In operation O904, in some cases, a scanner 125 may be a tool used to obtain and output information related to container identifying information and vulnerabilities of the container images. The scanner 125 may be used to retrieve container image information from a registry 915. A registry 915 may be a public or private server or other platform (any public or private space where container images may be hosted and shared may apply to the matching techniques described herein) where a repository 920 of container images can be hosted (a registry 915 is a server that can store all the images of the repositories 920). Users may fetch and download an image from the registry 915. For example, a user may download an image and host it internally within an internal organization. Examples of registries 915 may include a public Docker registry, a private AWS registry, and/or the like.

When a repository 920 is hosted on a registry 915 and container images are passed to the registry 915, another hash (a hash in addition to container image ID hash) may be generated, typically known as a digest (referred to as container image digest herein). Otherwise, if the container image is just stored locally, it may only include a container image ID. Using the digest may allow an image to be passed around to different server(s). The container image digest may be a hash of a manifest (e.g., a manifest generated on request, or a manifest file, and such) for the hosted container image. Like the container image ID, the container image digest may be a SHA-256 hash, but unlike the container image ID, it may include additional metadata that the registry 915 that the container image has been passed to collects. This metadata may be commonly known as an image manifest. In some cases, the manifest may be a file (for example, a JSON file) that describes characteristics of the image as well as information related to how it is stored on the registry 915 (this image has this name it has been compressed into 5 files with these individual respective hashes). In such a case, the container image digest may be the SHA-256 of the JSON file. The container image digest may be unique for each container image. While stored on the registry 915, the container image may include 2 different pieces of identifiable information: the container image ID and the container image digest. As described herein, such information may be used when performing the matching process. In some cases, registries 915 may use different means to store the image. For example, at a first instance, a register 915 may perform a first compression algorithm (zip) on an image while, at a second instance, the register 915 may perform a second compression algorithm (gzip) on the same image. In such a case, due to the different ways of storing the image (compressing the data differently results in the data being different), a same image stored at the register 915 may have different container image IDs and container digests. Such an issue may come up when using secondary registries which may be a secondary place where the same image might be stored for the same repository 920. In such a case, the matching process described herein may be used to identify that these two container images are the same and are stored on two different registries 915.

As an example, a developer may pull a container image from a registry 915 and extend it locally, which would create a new version of the container image. Additionally, this new version may be tagged accordingly. When the developer pushes the new version back to the registry 915, the registry 915 may recognize this received container image as the latest version hosted on this registry 915 (this is the latest version of this image stored in this repository 920) and may assign it a tag that marks it as the latest version. The registry 915 may also remove the latest version tag from the container image that currently has been assigned it. This may allow a server running the image to know that it is running the latest version. In some cases, such version control may allow a server to pull a previous version of the image and run it upon a request. For example, a request may be received by the server to run a version of the image with a given name and/or date, and since the server has been tracking the versions, it may execute such requested version without issue.

The scanner 125 may retrieve container image information from any public or private server where a repository 920 of container images can be hosted and user(s) can download and modify container images. But as discussed in operation O906, the output information of the scanner 915 may be in such a poor condition that determining if a vulnerability relates to a container image already existing in the system 110 (and if so, which one) or if it relates to a new container image is a challenge. This issue may result in an inability to properly assess whether an asset in question has already been considered and thus the system is up-to-date or if it is one that needs to be further analyzed for vulnerabilities. The matching techniques described herein address this issue.

In operation O906, source data may be obtained from one or more sources. As an example, a source may be a scanner 125 (or multiple scanners outputting inconsistent data for identical container assets), for example, an asset scanner or a vulnerability scanner, that pulls and outputs data related to asset(s) and/or finding(s). It should be noted that while scanner(s) 125 are discussed herein, other sources and/or tools may be used to retrieve such data such as a management database (configuration management database (CMDB)), an asset registry, and/or the like. Source data may be obtained from a large set of sources, where each source may be known for producing source data at a certain level of integrity (e.g., a first source may produce source data that is more reliable than a second source). The sources, such as a scanner 125, may output source data with chunks of information (for example, information that can be used to identify a container image and properties of the container image) omitted. In some cases, the scanner 125 may only expose some of the pulled information or in some way too difficult to assess. For example, the scanner 125 may provide all of the vulnerability data of the assets but only a portion of the container image identifying data. Additionally, different scanners 125 may output source data in different formats (e.g., describe the same container image in three different data formats), which can add to the difficulty of identifying which asset the source data is related to. Techniques described herein may in general rebuild such missing data and discover an accurate set of assets. The source data for an asset and/or finding may include data bits indicative of container image identifying information. As described with respect to FIG. 11, these bits may be extracted and analyzed to identify data bits related to container image identifying information. When such data bits have been identified (by the vulnerability management system 110), the data bits may be sent to a deduplication module 905 and may undergo a matching process described with respect to operations O908 and O910.

In operation O908, the deduplication module 905 may receive the output (extracted data bits) from the source regarding information associated with an asset at interest. A scanner 125 may be used as an example herein. The output from the scanner 125 may include the repository identifier described with respect to operation O902. In some cases, the output may include either the container image ID or the container image digest. In some cases, the output may not include both the container image ID and the container image digest. In some cases, neither the container image ID or the container image digest may be included and instead, the output may only include the tag(s) or other metadata (e.g., platform data fields), as described herein. To summarize, the output may include information related to one or combinations of the following: (1) repository identifier; (2) container image digest; (3) container image ID; (4) tag data (e.g., name of tag); and/or (5) platform data fields. In some cases, the platform data fields may include one or combinations of: platform os, platform os version, platform os features, platform architecture, platform architecture features, and/or platform architecture variant. In some cases, the platform data fields may include information related to the architecture that the image was built for (described with respect to operation O902).

In operation O910, a matching process may be performed between the deduplication module 905 and the asset structured database 910. The database 910 may be indexed with a dataset (referred to as "container image dataset") comprising data (e.g., entries or records) for container images contained in the one or more repositories 920 (e.g., starting at a first period and updated as assets are added, updated or removed) in such a way that the system 110 may be able to query the database 910 and pull information related to a stored container image such as the container image ID, container image digest, repository identifier that the container image sits in, tags, platform data fields, and/or the like. For example, for each stored container image in the container image dataset, the database 910 may store sets of values for identification fields corresponding to the above information. In some cases, a repository identifier field may hold a value or set of values related to which repository 920 the container image is stored in, and at least one hash field. The at least one hash field may hold a value or set of values related to the container image ID and container image digest of the container image. In some cases, the database 910 may store metadata in additional fields, such as tags or platform data fields. Additional fields may be included such as an image registry field that holds the name of the registry 915 (URL), a second image registry field for any additional registries that the image has been observed, and the like.

The data bits described above may be compared to the values of each stored container image in order to see if there is a match. In some cases, the matching process may begin by analyzing the repository identifier. For instance, the deduplication module 905 may require the repository identifier source before proceeding. Next, the matching process may involve performing the match analysis using the container image digest (this might be considered the information most likely to result in an accurate match result). If the container image digest has not been provided, the deduplication module 905 may use the combination of the repository identifier and container image ID to perform the match analysis. To summarize the process above, the deduplication module 905 may first find all assets in the database that have a repository identifier that matches the repository identifier in the asset at interest (as determined by the extracted bits). After identifying these assets, the deduplication module 905 may determine whether any have the same container image digest as the asset in question. If yes, the deduplication module 905 may determine a match has been detected. If no, the deduplication module 905 may determine whether any have the same container image ID as the asset in question. If yes, the deduplication module 905 may determine a match has been detected. If no, then the deduplication module 905 may deem this asset as a new asset and add it to the database 910 and repository 920 accordingly. If a match has been detected, the deduplication module 905 may add (update a record) any vulnerabilities contained in the new asset to the existing asset. As described with respect to FIG. 11, any update to the record of the vulnerabilities may result in a changed vulnerability status that may be presented on a display accessible to a user. In some cases, these searches may be performed in parallel or in sequence, or various database searching methodologies (e.g., unions on tables, etc.)

In some cases, the matching process may be used to add to and/or enrich assets already existing in the database 910. For example, an asset (container image) may already be stored on the database and accordingly on a repository 920 of the platform. The stored asset may only have information related to the image container digest and no information related to the image container ID. A new asset finding may be received by the system 110 (e.g., the deduplication module 905) that may contain information conveying both the image container digest and the image container ID. In such a case, the system 110 may update the asset in the database 910 and repository 920 with the image container ID. In another example, if a stored asset has information related to both the image container digest and the image container ID and a new asset finding is received with the same image container digest but a different image container ID, the system 110 may overwrite the currently stored image container ID with the new image container ID.

In some cases, if the extracted bits of the new asset contain no information related to image container ID or image container digest, then the system 110 (e.g., the deduplication module 905) may use a combination of the tags, repository identifier, and platform data fields (e.g., information related to the architecture that the image was built for) when performing match analysis. It may be useful to use both the tags and platform data fields (as opposed to just using the tags) to avoid overmatching (e.g., treating two different assets as a same asset). For example, a scenario may exist where two images are built for different architecture with different sets of vulnerabilities but have the same tag. It may be desirable for the system 110 to treat these as two different assets (container images). Thus, the system 110 may consider the platform data fields to resolve ambiguities. In some cases, a new asset may be received with no architecture information. In response, the system 110 may store such asset and set values of "unknown" to the identification fields corresponding to the architecture information (e.g., the OS value will be "unknown" and the CPU architecture will be "unknown"). In this case, the system 110 may allow a subsequent asset with known architecture information be determined as new rather than a duplicate. If under inclusive (e.g., marking as a new asset instead of an existing asset), the system 110 may enable a user registered to the system 110 to manually (e.g., via a graphical user interface) instruct the system 110 that these assets should be considered the same and the system 110 may merge them.

After operations O902 through O910, the system 110 may perform one or more of operations O308 through O322, which are described with respect to FIGS. 1-8. In some cases, an interface with a user device 105 which may allow a user registered to the system 110 to ascertain vulnerability statuses (from a first time period to a subsequent time period) of their one or more container images. The interface may be a management graphical user interface displayed to the user as described with FIG. 11 (e.g., as a report of managed assets) or the interface may be a vulnerability management graphical user interface (e.g., to report assets and vulnerabilities for those assets, if present). As described with respect to operations O908 and O910, when a record for a container image has been updated and/or generated in the asset structured database 910 and accordingly its vulnerability status has been changed, this change may be populated to the interface such that a user may see the new vulnerabilities of container images. As mentioned above, the matching techniques described herein may result in the asset set (including the container images) and the vulnerability status of each asset in the asset set being more accurate by means of reducing the number of duplicate assets while preventing the risk of overmatching.

FIG. 10 depicts a GUI 1000 for container image deduplication in vulnerability detection and management. The GUI 1000 for container image deduplication in vulnerability detection and management may apply to features of FIGS. 1, 2, 3, 4A-4B, 5A-5B, 6A-6F, 7-9, and 11.

The GUI 1000 may show the display for the user interface as described with respect to FIG. 9. As shown, fields of each asset may be depicted. For example, the fields may include one or combinations of: the repository that the asset currently sits in, any registers that are hosting the asset, secondary registries, alias(es), ID of the asset, digest of the asset, tags (present and/or past), OS data, platform data, business owner data, and/or support team data. The platform data may include OS data (e.g., OS name, OS version, OS features, etc.), architecture data (e.g., hardware of the container image, such as CPU or GPU type, architecture variant, and architecture features, etc.). Business owner data may include user and/or team data. The support team data may include team data. Each field of the fields may store a value (e.g., input by the system 110 based on scanners, user inputs, etc.), a null value, or an empty field. Some fields may store text strings, while others (e.g., team or user fields) may store selections from defined lists (e.g., a list of users or teams). The fields may also include a field for asset groups (see FIGS. 1-8) and/or a description field. A user registered to the platform may have ability to edit any one of these fields for a given asset. The system 110 may respond by performing an update to the database 910.

FIG. 11 depicts a flowchart of an exemplary routine 1100 for container image deduplication in vulnerability detection and management. The routine 1100 for container image deduplication in vulnerability detection and management may apply to features of FIGS. 1, 2, 3, 4A-4B, 5A-5B, 6A-6F, 8, 9, and 10. In the routine 1100, the routine 1100 may be performed by one or more systems, such as the vulnerability management system 110 and/or at least one scanner 125.

At block 1102, the system 110 may obtain source data from at least one source (e.g., from the scanner 125). In some cases, the source data includes a plurality of assets and/or findings. For instance, the system 110 may receive a most recent scan from the scanner 125.

At block 1104, the system 110 may extract data bits for each asset or finding from the source data. In some cases, to extract the data bits for each asset or finding from the source data, the system 110 may be configured to: determine a type of source; determine a source model based on the type of source; extract, for each asset or finding, the data bits for the finding using the source model; and map the extracted data bits in a defined format for recall. As discussed herein, the system 110 may have different parsers to handle different scanner results. Moreover, since the scanner results may be formatted in a format different form the system 110, the system 110 may map the relevant data to the define format (e.g., for the system 110).

At block 1106, the system 110 may determine a first asset or finding concerns a first container image based on the data bits for the first asset or finding. For instance, the system 110 may determine whether an asset type of the first asset or finding corresponds to a container image type, or if the first asset or finding includes an ID or digest.

At block 1108, the system 110 may, in response to determining the first asset or finding concerns the first container image, obtain a container image dataset. For instance, the system 110 may retrieve the container image dataset from the database 910. In some cases, the system 110 may search the container image dataset in the database 910.

In some cases, the container image dataset may include a plurality of sets of values for identification fields. In some cases, each of the plurality of sets of values respectively correspond to a container image asset of a plurality of container image assets. In some cases, the identification fields include, at least, a repository identifier field and a hash field.

At block 1110, the system 110 may determine whether the data bits match any of the plurality of sets of values from the container image dataset. For instance, the system 110 may perform the match process, as discussed herein.

At block 1112, the system 110 may, based on a match result, generate or update records for the first container image. In some cases, the match result may indicate no matching entries/records in the container image dataset; in some cases, the match result may indicate a matching entry/record in the container image dataset. In the case of no matching entries/records, the system 110 may generate a new entry/record. In the case of a matching entry/record, the system 110 may update the matching entry/record.

At block 1114, the system 110 may, based on the generated or updated records for the first container image, determine and display a vulnerability status from a first time period to a second time period. For instance, the system 110 may cause a management graphical user interface to be displayed to a user (e.g., on a user device). The management graphical user interface may display the vulnerability status from the first time period to the second time period. In some cases, the system 110 may not have any vulnerabilities associated with the asset, but the system 110 may still display an asset history associated with the asset. For instance, the asset history may display a date the asset was added to the system 110, updates to the asset data over time (e.g., new data was added or data was removed), and, if any, vulnerabilities (and their status) over time.

In some cases, the hash field stores a container image digest or a container image id. In some cases, the container image digest is a hash of a manifest file for the first container image. In some cases, the container image id is a hash of a configuration file for the first container image.

In some cases, the hash field is a first hash field, and the identification fields further includes a second hash field. In some cases, the first hash field stores a container image digest, and the second hash field stores a container image id.

In some cases, to determine whether the data bits match any of the plurality of sets of values, the system 110 may be configured to: determine whether the data bits include a repository identifier value, and at least one of: a first hash value for the first hash field or a second hash value for the second hash field. In some cases, the repository identifier value may be omitted. In some cases, the system 110 may hold a relevant asset or finding until a user indication with respect to the repository identifier value may be provided (or additional data is found, e.g., in new scanner results).

In some cases, the system 110 may be configured to: in response to determining the data bits do include the repository identifier value and at least one of the first hash value or the second hash value, determine whether a first match condition is satisfied. For instance, the system 110 may perform the match process as discussed herein.

In some cases, the first match condition may be satisfied when a set of values, of the plurality of sets of values for identification fields (associated with entries/records for known assets), match (a) the repository identifier value and the first hash value, (b) the repository identifier value and the second hash value, or (c) the repository identifier value, the first hash value, and the second hash value. In a case that (a) or (b) is matched, the system 110 may be configured to: update an asset record for the first container image with an omitted value using the first hash value or the second hash value. In a case that a container image digest value matches but a container image id does not match, the system 110 may be configured to: overwrite the container image id in an asset record for the first container image.

In some cases, the system 110 may be configured to: in response to determining the data bits (1) do include the repository identifier value and (2) do not include at least one of the first hash value or the second hash value, determine whether a second match condition is satisfied. For instance, in some cases, the identification fields (e.g., of entries/records) further include one or combinations of: a tag field, and/or platform data fields. The second match condition may be satisfied when a set of values (of an asset of interest) match (on an entry/record): (a) the repository identifier value and a tag value for the tag field, or (b) the repository identifier value, the tag value, and platform data value(s) of the platform data fields. In a case that (a) is matched and (b) is not matched, the system 110 may be configured to: generate a new asset record for the first container image, so that platform variation is tracked as a different asset.

Thus, systems and methods of the present disclosure may accurately track assets/vulnerabilities, even when scanner results do not provide complete datasets for assets or vulnerability findings.

Host Matching

Figure 12:
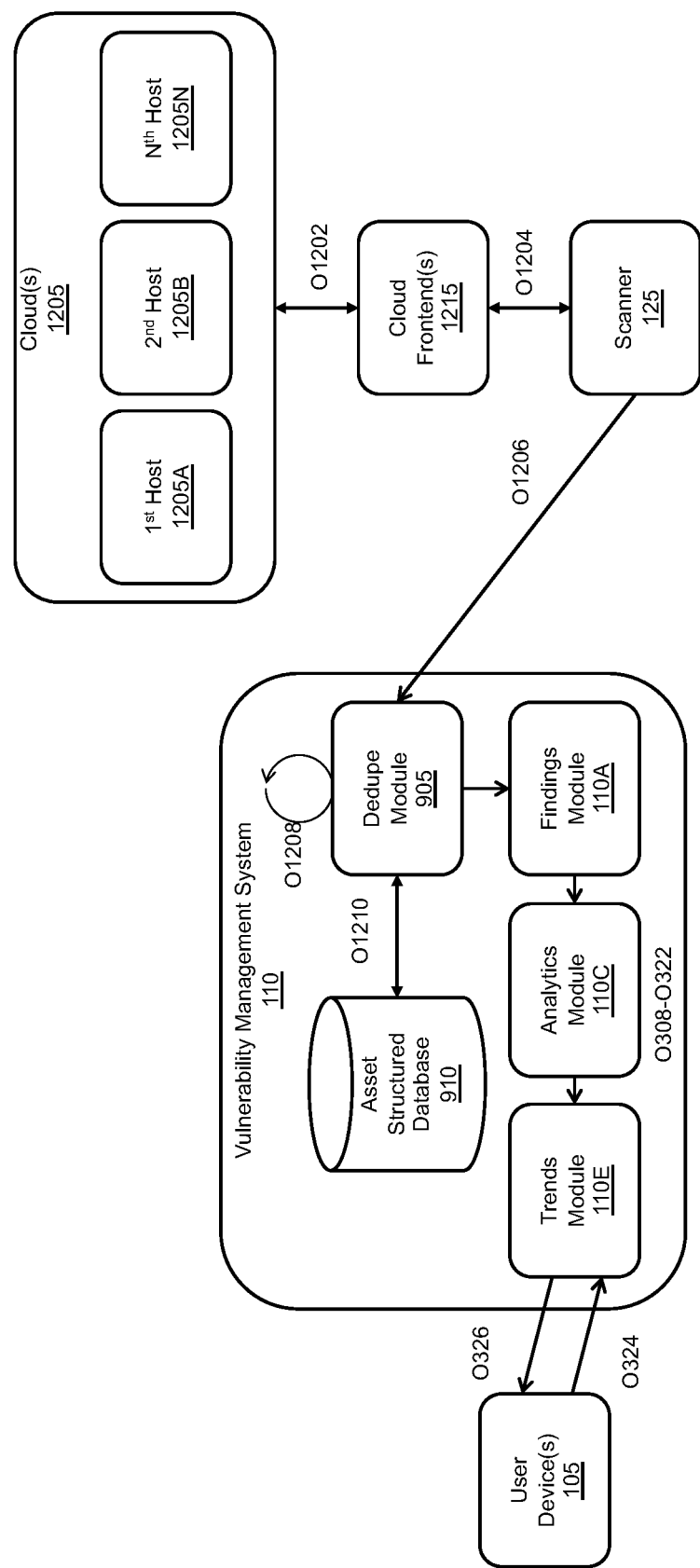
FIG. 12 depicts a depicts a block diagram for host matching for a vulnerability management system.

FIG. 12 depicts a depicts a block diagram 1200 for host matching in a vulnerability management system 110. Diagram 1200 depicts operations O1202 through O1210 in context of operations O308 through O326 of diagram 300. Diagram 1200 depicting host matching may apply to features of FIGS. 1, 2, 3, 4A-4B, 5A-5B, 6A-6F, 7-11, 13, and 14. In this case, the vulnerability management system 110 may include the findings module 110A, the finding data structure 110B (not shown), the analytics module 110C, the analytics data structure 110D (not shown), the trends module 110E, the trends data structure 110F (not shown), the deduplication module 905, and the asset structured database 910. The diagram 1200 also depicts one or more of the following: cloud(s) 1205 comprising one or more hosts (first host 1205A, second host 1205B, and up to n$^{th}$ host 1205N); a cloud frontend 1215 (in some cases, one or more cloud frontends as described herein); the scanner 125; and/or the user device 105, each of which may be described further below. In some cases, data may be obtained by the system 110 via a connector or via direct uploads (a user directly uploads a file to the platform). It should be noted that many of the following operations may be or include similar techniques described with respect to FIG. 9. For example, operation O1202 may have features similar to features described in operation O902 but may include additional features to enable it to be applied for host matching (whereas operation O902 was concerned with than container image matching). The same may be true for operations O1204 though 1210.

In operation O1202, data regarding assets and/or findings may be obtained from a variety of sources (e.g., the scanner 125). An asset may include any application or device which is self-contained. For example, an asset may be a host (e.g., a VM). In some cases, an asset may include container images, containers, web applications, source code repositories and/or the like (an extension may need to be added to the matching process and/or other aspects of the system in order for it be able to process the above options). For purposes of illustration, an asset may be a host when described herein and accordingly that matching process may involve matching hosts.

In operation O1204, one or more cloud frontends 1215 may be linked to the scanner 125. In some cases, the cloud frontends 1215 may store or provide data, for example, from a cloud (or other server). For example, the cloud frontends 1215 may provide host data similar to how the registers described with respect to FIG. 9 function. The data may relate to one or more hosts stored on the cloud(s) 1205. In some cases, a connector (which may be deployed in a connector architecture separate from a scan parser architecture described herein) may obtain (download) data form the cloud frontends 1215 related to assets such as the hosts. In some cases, a scanner 125 may employ a scan parser (which may be included in a scan parser architecture) to parse and process the data obtained by the connector. Each connector may be associated with a respective scan parser whereby how the scan parser parses the data depends at least partially on the type (or other characteristics) of connector used.

In operation O1206, the data (source data) may be received by the system 110. The system 110 may pre-process the data to configure the data (e.g., normalize the data) into a schema that can be processed by the system 110. This step may involve the system 110 going through data irrespective of the host information. The output of pre-processing the data (source data) may be an indication of all of the asset information and/or finding information. In some cases, the data may only include asset data. In some cases, the data may include only finding data. In some cases, the data may include asset data and finding data. In some cases, the asset information is separate from the finding information. Additionally, the system 110 may create a pre-duplication of the asset based on the obtained data that will be used during the matching process. This may be important due to the possibility of the connector having a certain error rate that causes two assets to be erroneously deemed as different when they should be deemed as the same. During the pre-process step, the system 110 may pre-merge such assets before performing any matching operation (e.g., matching the asset(s) with the assets existing the database 910). Generally, the pre-deduplication process may apply the same principles as discussed below, but instead of matching against data stored in the database 910 (e.g., known assets), the pre-deduplication process may match against itself (e.g., finding entries/records from the scanner that relate to a same asset).

Before performing an update or generate records process, the system 110 may process the (pre-processed) data through the deduplication module 905 to execute the matching process. For example, if the data obtained relates to a host, the matching process may output whether the host in question matches any host already existing in the database or whether it should be considered a new host and stored as such. In some cases, the data received may additionally include one or more parameters (which may be used to identify the connector and/or parser used).

The operations and/or order of the operations performing during the matching process may depend at least in part on the connector used to download the data as well as the scan parser used to parse the data. For example, when performing the match process, the deduplication module 905 may be configured with logic to execute instructions applicable to all parsers (generic instructions) as well as logic to be added that is unique for a specific parser (e.g., the parser that parsed the data associated with the host in process). This feature may allow the matching process to be customized for given connectors and/or parsers. In some cases, determining the generic instructions described above may be based on a cloud or server type that hosts the host. Using this example, logic specific to the parser used may be added to the generic logic. The specific instructions may factor into defining the operations performed during the matching process. In some cases, custom criteria information related to specific details of the parser may additionally be included when setting the specific instructions. The deduplication module 905 may consider the parameters included with the received data when determining how to set the above logic/instructions.

In operation O1208, the deduplication module 905 may be implemented by the system to perform the matching process in order to avoid having any duplicates of hosts on the system 110. Similar to FIG. 9, reducing the number of duplicate hosts may assist in keeping track of host vulnerabilities. Bits related to the asset (host) may be extracted from the source data generated by the scanner 125 and used by the system to perform host matching. For example, data may be extracted from APIs linked to the scanner 125. In some cases, the scanner 125 may be linked to 2 different APIs: an asset API and a finding API. When extracting the bits, the system may be able to differentiate between source data obtained from the asset API and source data obtained from the finding API. Additionally, the matching process performed may be different dependent on the source of the data. For example, data obtained from the finding API may include information (for example, host information) that can be used by the system to negate previous matches. In some cases, this information may not be included in an asset export obtained from the scanner 125. In such a case, the deduplication module 905 may need to retrieve the information from the API.

The matching process may be based on a tiered set of rules. In some cases, the tiered set of rules may be defined in accordance with the type of scanner used. For instance, the tiered set of rules may be different for different types of scanners. A first match rule (also referred to as match operation herein) of the set of rules may determine whether a native host identifier of extracted data bits match a native host field of a record of a search structure described with respect to operation O1210. A second match rule of the set of rules may determine whether a source identifier of the data bits match a source filed of the record of the search structure. In some cases, the first match rule may be applied before the second match rule. In some cases, if the first match rules results in a match, the second match rule may not be applied. In some cases, if the second match rule is inconsistent with the first match rule, the system 110 may update a source field of an existing asset with a new source identifier.

Determining whether to apply the first match rule or the second match rule may be based on the set of parameters of the source data (as mentioned herein). In some cases, the set of parameters may be used to determine which existing assets (hosts) should be considered during the matching process and, additionally, whether additional matching criteria should be considered during the matching process.

In operation O1210, a matching process may be performed between the deduplication module 905 and the database (which may be store data for a search structure). As mentioned in operation O1208, the search structure may include a record of values for a set of fields for each known host. The process may be used to determine whether an incoming asset, or more specifically a host, matches an asset already existing in the database 910. As described in operation O1206, characteristics of the scanner (or in other words, the scan parser of the scanner) may be considered when determining a match. For example, a scan may be marked as either authenticated or unauthenticated (a scan may be deemed as unauthenticated when there is not enough verifying information) and the way assets are matched may depend on such determination. For example, an asset that would otherwise have a match if generated from an authenticated scan may be determined as having no match if generated from an unauthenticated scan. Techniques used during the matching process may be similar to those described with respect to FIG. 9.

In some cases, determining which matching operation to perform may involve determining which parameters (in other words, fields) are present in a data set of an incoming asset. In some cases, based on the parameters set, an index matching array may be called which may dictate which matching operation(s) (and the order of the operations) of the matching process should be applied to the incoming host. For example, the matching operations may determine to first compare instances (e.g., EC2 instances, GPC compute instances, Azure compute virtual machines, etc.), then architectures, and so on. The operations may be ordered based on assigned priorities (e.g., operations more likely to result in a match may be given higher priorities while those less likely to result in a match may be given lower priorities). In some cases, all of the operations may be required to be executed for a given incoming asset to match. In some cases, only a subset of the operations may be required to be executed for a given incoming asset to match.

Similar to FIG. 9, based on identifying these assets, the deduplication module 905 may determine whether any have the same host as the host in question. If yes, a match may be detected. If no, then the deduplication module 905 may deem this asset as a new asset and add it to the database 910. If a match has been detected, the deduplication module 905 may add (e.g., update findings and/or a record) any vulnerabilities contained in the asset of interest to the existing asset. Any update to the record of the vulnerabilities may result in a changed vulnerability status that may be presented on a display accessible to a user.

In some cases, a feedback mechanism may be included and executed by the system to detect when a host gets matched incorrectly. Additionally, the feedback mechanism may be used to provide analysis on why the incorrect match was made (e.g., compare the host data stored in the database 910 with the data included in the file) in order to improve the matching process. The database 910 may include history logs for each asset that may track how an asset changes over time. For example, a user registered to the system 110 may access and edit their hosts, and the system 110 may track those changes (e.g., for display, roll back, etc.). In some cases, a key value pair may be set when an incoming asset matches an existing asset. The pair may be used by the system used to identify which part of the matching process detected a hit resulting in an identified match, given that it was parsed by a specific parser.

After operations O1202 through O1210, the system may perform one or more of operations O308 through O322, which are described with respect to FIGS. 1-8. In some cases, an interface with a user device which may allow a user registered to the system to ascertain vulnerability statuses (e.g., from a first time period to a subsequent time period) of their one or more hosts. The interface may be a management graphical user interface displayed to the user as described with FIG. 11. As described with respect to operations O1208 and O1210, when a record for a host has been updated and/or generated in the asset structured database and accordingly its vulnerability status has been changed, this change may be populated to the interface such that a user may see the new vulnerabilities of his or hers hosts. In some cases, the updated or generated record may not be associated with a vulnerability (e.g., in the case of an asset scan). In these cases, the system 110 may display existing or new data of the existing or new asset, even though it does not currently have a vulnerability detected in the system 110. As mentioned above, the matching techniques described herein may result in the asset set (including the hosts) and the vulnerability status of each asset in the asset set being more correct by means of reducing the number of duplicate assets while preventing the risk of overmatching.

Figure 13:
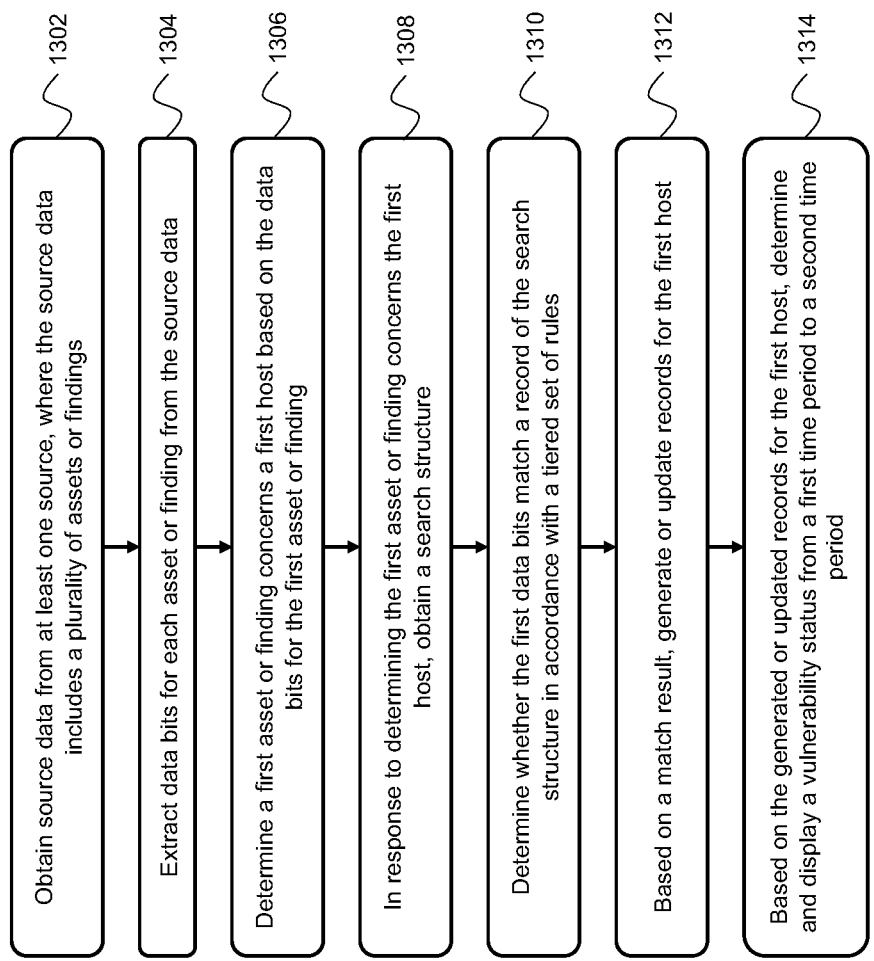
FIG. 13 depicts a flowchart of an exemplary routine for host matching in vulnerability detection and management.

FIG. 13 depicts a flowchart of an exemplary routine 1300 for host deduplication in vulnerability detection and management. The routine 1300 for host deduplication in vulnerability detection and management may apply to features of FIGS. 1-12 and 14. In the routine 1300, the routine 1300 may be performed by one or more systems, such as the vulnerability management system 110 and/or at least one scanner 125.

At block 1302, the system 110 may obtain source data from at least one source (e.g., the scanner). The source data may include a plurality of asset findings and/or vulnerability findings. For instance, the system 110 may receive a most recent scan from the scanner 125.

At block 1304, the system 110 may extract data bits for each asset finding or vulnerability finding from the source data. In some cases, to extract the data bits for each asset or finding from the source data, the system 110 may be configured to: determine a type of source; determine a source model based on the type of source; extract, for each asset or finding, the data bits for the finding using the source model; and map the extracted data bits in a defined format for recall. As discussed herein, the system 110 may have different parsers to handle different scanner results. Moreover, since the scanner results may be formatted in a format different form the system 110, the system 110 may map the relevant data to the define format (e.g., for the system 110).

At block 1306, the system 110 may determine a first asset finding or first vulnerability finding concerns a first host based on first data bits for the first asset finding or the first vulnerability finding. For instance, the system 110 may determine whether an asset type of the first asset or finding corresponds to a host type, or if the first asset or finding includes a host ID, and the like.

At block 1308, the system 110 may, in response to determining the first asset finding or the first vulnerability finding concerns the first host, obtain a search structure. For instance, the search structure may include, for each record of a plurality of records of the search structure, known-host values for a set of fields for known hosts.

At block 1310, the system 110 may determine whether the first data bits match a record of the search structure in accordance with a tiered set of rules. For instance, the system 110 may perform the match process, as discussed herein, using the tiered set of rules. In some cases, the tiered set of rules may include at least a first match rule and a second match rule. In some cases, the first match rule may be configured to determine whether a native host identifier of the first data bits match a native host field of the record of the search structure. In some cases, the second match rule may be configured to determine whether a source identifier of the first data bits match a source field of the record of the search structure.

At block 1312, the system 110 may, based on a match result, generate or update records for the first host. In some cases, the match result may indicate no matching entries/records for the first host; in some cases, the match result may indicate a matching entry/record for the first host. In the case of no matching entries/records, the system 110 may generate a new entry/record for the first host. In the case of a matching entry/record, the system 110 may update the matching entry/record for the first host.

At block 1314, the system 110 may, based on the generated or updated records for the first host, determine and display a vulnerability status from a first time period to a second time period. For instance, the system 110 may cause a management graphical user interface to be displayed to a user (e.g., on a user device). The management graphical user interface may display the vulnerability status from the first time period to the second time period. In some cases, the system 110 may not have any vulnerabilities associated with the asset, but the system 110 may still display an asset history associated with the asset. For instance, the asset history may display a date the asset was added to the system 110, updates to the asset data over time (e.g., new data was added or data was removed), and, if any, vulnerabilities (and their status) over time.

In some case, the source data may be provided by an asset scanner or a vulnerability scanner. In some cases, the tiered set of rules may be determined based on a type of scanner.

In some cases, the system 110 may be configured to: in response to the first data bits including the native host identifier, applying the first match rule; and in response to the first data bits including the source identifier, applying the second match rule. In some cases, the first match rule may be applied before the second match rule. In some cases, the system 110 may be configured to: in response to the first match rule returning a match, not applying the second match rule. In some cases, the system 110 may be configured to: in response to the second match rule disagreeing with the first match rule, update the source field with a new source identifier.

In some cases, the tiered set of rules may include a third match rule. The third match rule may be configured to determine whether metadata, or portions of the metadata, match fields of the record of the search structure. In some cases, the system 110 may be configured to, in response to the third match rule disagreeing with the second match rule, update the source field with a new source identifier.

In some cases, the search structure may include a mapped index of fields to the known hosts. In some cases, the search structure may further include a plurality of indexes.

In some cases, the search structure may include a first index and a second index. The first index may map native identifiers to the known hosts, and the second index may map source identifiers to the known hosts. In some cases, the search structure may further include a third index, and the third index may map a subset of the set of fields to known hosts.

In some cases, the first index may select (from the database 910) all records that have a native ID for a known host, and map those known hosts to their respective native IDs. In some cases, the first index may be platform-dependent (e.g., an AWS native ID index, an Azure native ID index, a GCP native ID index, etc.). In some cases, the search structure may create more than one first index (e.g., for different cloud platforms). In this manner, the system 110 may cache a mapping of primary IDs (e.g., those that globally identify a host) to respective hosts known by the system 110. In this manner, searching for a match (for the host of interest on ingest) may be performed in an efficient manner (e.g., in O(n) time instead of O(n$^2$) time).

In some cases, the second index may select (from the database 910) all records that have a source ID for a known host, and map those known hosts to their respective source IDs. In some cases, the second index may be source-dependent (e.g., a first scanner type ID index, a second scanner type ID index, a third scanner type ID index, etc.). In some cases, the search structure may create more than one second index (e.g., for different sources). In this manner, the system 110 may cache a mapping of secondary IDs (e.g., those from sources that should, but do not always, globally identify a host) to respective hosts known by the system 110. In this manner, searching for a match (for the host of interest on ingest) may be performed in an efficient manner (e.g., in O(n) time instead of O(n$^2$) time).

In some cases, the third index may select (from the database 910) all records that have a defined subset of fields (e.g., name, IP address, host type) for a known host, and map those known hosts to their respective subsets of fields. The subsets of fields may any identifiable pieces of information provided as metadata on the asset. For instance, the subsets of fields may include one or combinations of: host name, IP address, host type, domain, NetBIOS name, fully qualified domain name (FQDN), MAC address, web application URL, code repository name, git repository URL, git branch, cloud account id, cloud region, cloud resource name, cloud resource id, cloud product name, cloud platform, and the like. In some cases, the third index may be source-dependent (e.g., a first scanner type index has a first subset of fields, a second scanner type index has a second subset of fields, a third scanner type index has a third subset of fields, etc.). In some cases, the search structure may create more than one third index (e.g., for different sources or for different subsets of fields). In this manner, the system 110 may cache a mapping of tertiary ID fields (e.g., those from sources that should, but do not always, provide complete or substantially-complete sets of data) to respective hosts known by the system 110. In this manner, searching for a match (for the host of interest on ingest) may be performed in an efficient manner (e.g., in O(n) time instead of O(n$^2$) time). In some cases, the system 110 may perform partial matching on tertiary fields (e.g., by searching substrings of host name or domains) versus strings of records for tertiary fields.

In some cases, the search structure may be generated at run-time from data in a database 910 (e.g., before ingest of a host of interest to the match process). In some cases, the search structure may be generated at set periods of time (e.g., each day, week, month, etc.) from the database 910.

In some cases, the tiered set of rules may be determined based on parameters, and the parameters are determined at runtime based on the source data. In some cases, the parameters may include: an indicator of the source, an indicator that a native ID is included the data bits, an indicator that a source ID is included the data bits, and at least one indicator that one or more fields of a subset of fields is included the data bits.

In some cases, a first set of parameters may deterministically set whether the first or second match rule is applied. For instance, the first set of parameters may include one or combinations of: the indicator of the source, the indicator that a native ID is included the data bits, and/or the indicator that a source ID is included the data bits. For instance, the first rule may be applied only if the indicator that a native ID is included the data bits is true, the second rule may be applied only if the indicator that a source ID is included the data bits. For instance, the first and second rule may be applied if the indicator of the source indicates one or more preset sources (e.g., scanner types).

In some cases, a second set of parameters may deterministically set the search structure. For instance, the first index (at least one first index) may be used (retrieved or generated) only if the indicator that a native ID is included the data bits is true, the second index (at least one second index) may be used (retrieved or generated) only if the indicator that a source ID is included the data bits, and the third index (at least one third index) may be used (retrieved or generated) only if at least one indicator that one or more fields of a subset of fields is included the data bits.

In some cases, the first or second set of parameters may also deterministically set matching criteria for the search structure. For instance, the matching criteria (e.g., on the indexes) may be determined based on the indicator of the source indicating one or more preset sources (e.g., scanner types). For instance, for a first scanner, the matching criteria may have a first set of matching criteria, and for a second scanner, the matching criteria may have a second set of matching criteria. The first set of matching criteria may be: first on primary ID, second on secondary ID for that first scanner, third on a first set of tertiary ID fields, fourth on a second set of tertiary ID fields, and so on. The second set of matching criteria may be: first on primary ID, second on secondary ID for that second scanner, third on a fourth set of tertiary ID fields (which may be the same or different from the first set of tertiary ID fields), fourth on a fourth set of tertiary ID fields (which may be the same or different from the second set of tertiary ID fields), and so on. Generally, the matching criteria may be defined for each scanner based on observed behavior of the scanner (e.g., by examining the scanner results output).

In some cases, the system 110 may be configured to: pre-process the source data into a defined schema. In some cases, the system 110 may deduplicate multiple findings for the first host, including the first asset finding or the first vulnerability finding and additional findings.

In some cases, the system 110 may, in response to determining the first asset finding or the first vulnerability finding includes partial data, retrieve additional data (e.g., via API call to a different scanner or an asset API of a scanner) to supplement matching on the record of the search structure. In this manner, the system 110 may proceed with a more complete set of data associated with the first host (thereby increasing accuracy of the system 110).

In some cases, the system 110 may, based on the generated or updated records for the first host, update an asset history for the first host. For instance, the system 110 may update discrete fields of the asset history based on certain indicators (e.g., a metadata field has omitted data before a scan, but a newer scan now indicates this data for this metadata field). In some cases, scanner IDs for assets may disagree, e.g., with a native host ID and the system 110 may map multiple scanner IDs to an asset (based on the native host ID being the same between the scanner IDs).

Thus, systems and methods of the present disclosure may accurately track assets/vulnerabilities, even when scanner results do not provide complete datasets for assets or vulnerability findings.

Computer System

Figure 14:
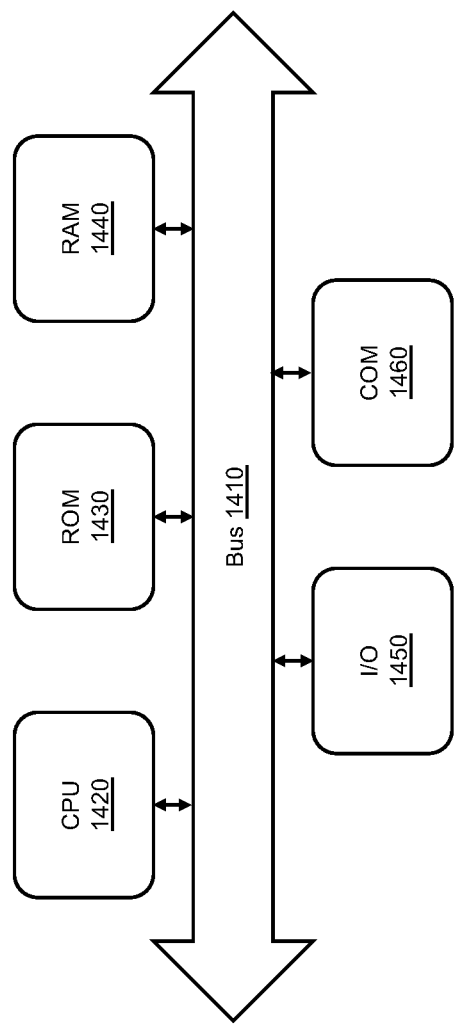
FIG. 14 depicts an example system that may execute techniques presented herein.

FIG. 14 depicts an example system that may execute techniques presented herein. FIG. 14 is a simplified functional block diagram of a computer that may be configured to execute techniques described herein, according to exemplary cases of the present disclosure. Specifically, the computer (or "platform" as it may not be a single physical computer infrastructure) may include a data communication interface 1460 for packet data communication. The platform may also include a central processing unit 1420 ("CPU 1420"), in the form of one or more processors, for executing program instructions. The platform may include an internal communication bus 1410, and the platform may also include a program storage and/or a data storage for various data files to be processed and/or communicated by the platform such as ROM 1430 and RAM 1440, although the system 1400 may receive programming and data via network communications. The system 1400 also may include input and output ports 1450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of +10% in a stated value.

The term "exemplary" is used in the sense of "example" rather than "ideal." As used herein, the singular forms "a," "an," and "the" include plural reference unless the context dictates otherwise.

Examples

Exemplary cases of the systems and methods disclosed herein are described in the numbered paragraphs below.

A1. A system for container image deduplication in asset and vulnerability management, the system comprising:
at least one memory configured to store instructions; and
at least one processor configured to execute the instructions to perform operations, wherein the operations include:
obtain source data from at least one source, wherein the source data includes a plurality of assets and/or findings;
extract data bits for each asset or finding from the source data;
determine a first asset or finding concerns a first container image based on the data bits for the first asset or finding;
in response to determining the first asset or finding concerns the first container image, obtain a container image dataset,
wherein the container image dataset includes a plurality of sets of values for identification fields,
each of the plurality of sets of values respectively correspond to a container image assets of a plurality of container image assets, and
the identification fields include, at least, a repository identifier field and a hash field;
determine whether the data bits match any of the plurality of sets of values;
based on a match result, generate or update records for the first container image;
based on the generated or updated records for the first container image, determine a vulnerability status from a first time period to a second time period; and
cause a management graphical user interface to be displayed to a user, wherein the management graphical user interface displays the vulnerability status from the first time period to the second time period.

A2. The system of A1, wherein, to extract the data bits for each asset or finding from the source data, the operations further include: determine a type of source; determine a source model based on the type of source; extract, for each asset or finding, the data bits for the finding using the source model; and map the extracted data bits in a defined format for recall.

A3. The system of any of A1-A2, wherein the hash field stores a container image digest or a container image id.

A4. The system of A3, wherein the container image digest is a hash of a manifest file for the first container image.

A5. The system of A3, wherein the container image id is a hash of a configuration file for the first container image.

A6. The system of any of A1-A5, wherein the hash field is a first hash field, and the identification fields further includes a second hash field.

A7. The system of A6, wherein the first hash field stores a container image digest, and the second hash field stores a container image id.

A8. The system of A6, wherein, to determine whether the data bits match any of the plurality of sets of values, the operations further include: determine whether the data bits include a repository identifier value, and at least one of: a first hash value for the first hash field or a second hash value for the second hash field.

A9. The system of A8, wherein the operations further include, in response to determining the data bits do include the repository identifier value and at least one of the first hash value or the second hash value, determine whether a first match condition is satisfied.

A10. The system of A9, wherein the first match condition is satisfied when a set of values, of the plurality of sets of values for identification fields, match (a) the repository identifier value and the first hash value, (b) the repository identifier value and the second hash value, or (c) the repository identifier value, the first hash value, and the second hash value.

A11. The system of A10, wherein, in a case that (a) or (b) is matched, the operations further include: update an asset record for the first container image with an omitted value using the first hash value or the second hash value.

A12. The system of A10, wherein, in a case that a container image digest value matches but a container image id does not match, the operations further include: overwrite the container image id in an asset record for the first container image.

A13. The system of A8, wherein the operations further include, in response to determining the data bits (1) do include the repository identifier value and (2) do not include at least one of the first hash value or the second hash value, determine whether a second match condition is satisfied.

A14. The system of A13, wherein the identification fields further include one or combinations of: a tag field, and/or platform data fields.

A15. The system of A14, wherein the second match condition is satisfied when a set of values match: (a) the repository identifier value and a tag value for the tag field, or (b) the repository identifier value, the tag value, and platform data value(s) of the platform data fields.

A16. The system of A15, wherein, in a case that (a) is matched and (b) is not matched, the operations further include: generate a new asset record for the first container image, so that platform variation is tracked as a different asset.

A17. A computer-implemented method for container image deduplication in vulnerability detection and management, the computer-implemented method comprising:
obtaining source data from at least one source, wherein the source data includes a plurality of assets and/or findings;
extracting data bits for each asset or finding from the source data;

determining a first asset or finding concerns a first container image based on the data bits for the first asset or finding;
in response to determining the first asset or finding concerns the first container image, obtaining a container image dataset,
  wherein the container image dataset includes a plurality of sets of values for identification fields,
  each of the plurality of sets of values respectively correspond to a container image assets of a plurality of container image assets, and
  the identification fields include, at least, a repository identifier field and a hash field;
determining whether the data bits match any of the plurality of sets of values;
based on a match result, generating or updating records for the first container image;
based on the generated or updated records for the first container image, determining a vulnerability status from a first time period to a second time period; and
causing a management graphical user interface to be displayed to a user, wherein the management graphical user interface displays the vulnerability status from the first time period to the second time period.

A18. The computer-implemented method of A17, wherein the hash field stores a container image digest or a container image id.

A19. The computer-implemented method of A18, wherein the container image digest is a hash of a manifest file for the first container image, and the container image id is a hash of a configuration file for the first container image.

A20. A system for container image deduplication in vulnerability detection and management, the system comprising:
at least one memory configured to store instructions; and
at least one processor configured to execute the instructions to perform operations, wherein the operations include:
  obtain scanner data from at least one scanner, wherein the scanner data includes a plurality of findings;
  extract data bits for each finding from the scanner data;
  determine a first finding concerns a first container image based on the data bits for the first finding;
  in response to determining the first finding concerns the first container image, obtain a container image dataset,
    wherein the container image dataset includes a plurality of sets of values for identification fields,
    each of the plurality of sets of values respectively correspond to a container image assets of a plurality of container image assets, and
    the identification fields include, at least, a repository identifier field and a hash field;
  determine whether the data bits match any of the plurality of sets of values;
  based on a match result, generate or update records for the first container image;
  based on the generated or updated records for the first container image, determine a vulnerability status from a first time period to a second time period; and
  cause a vulnerability management graphical user interface to be displayed to a user, wherein the vulnerability management graphical user interface displays the vulnerability status from the first time period to the second time period.

B1. A system for host matching in asset and vulnerability management, the system comprising:
at least one memory configured to store instructions; and
at least one processor configured to execute the instructions to perform operations, wherein the operations include:
  obtain source data from at least one source, wherein the source data includes a plurality of asset findings and/or vulnerability findings;
  extract data bits for each asset finding or vulnerability finding from the source data;
  determine a first asset finding or first vulnerability finding concerns a first host based on first data bits for the first asset finding or the first vulnerability finding;
  in response to determining the first asset finding or the first vulnerability finding concerns the first host, obtain a search structure,
    wherein the search structure includes, for each record of a plurality of records of the search structure, known-host values for a set of fields for known hosts;
  determine whether the first data bits match a record of the search structure in accordance with a tiered set of rules,
    wherein the tiered set of rules include at least a first match rule and a second match rule,
    the first match rule is configured to determine whether a native host identifier of the first data bits match a native host field of the record of the search structure, and
    the second match rule is configured to determine whether a source identifier of the first data bits match a source field of the record of the search structure;
  based on a match result, generate or update records for the first host;
  based on the generated or updated records for the first host, determine a vulnerability status from a first time period to a second time period; and
  cause a management graphical user interface to be displayed to a user, wherein the management graphical user interface displays the vulnerability status from the first time period to the second time period.

B2. The system of B1, wherein the source data is provided by an asset scanner or a vulnerability scanner, and the tiered set of rules is determined based on a type of scanner.

B3. The system of B2, wherein the tiered set of rules is determined based on parameters, and the parameters are determined at runtime based on the source data.

B4. The system of B3, wherein a first set of parameters deterministically set whether the first or second match rule is applied.

B5. The system of B3, wherein a second set of parameters deterministically set the search structure.

B6. The system of B5, wherein the second set of parameters also deterministically set matching criteria for the search structure.

B7. The system of any of B1-B6, wherein the operations further include: in response to the first data bits including the native host identifier, applying the first match rule; and in response to the first data bits including the source identifier, applying the second match rule.

B8. The system of B7, wherein the first match rule is applied before the second match rule.

B9. The system of B7, wherein the operations further include: in response to the first match rule returning a match, not applying the second match rule.

B10. The system of B7, wherein the operations further include: in response to the second match rule disagreeing with the first match rule, update the source field with a new source identifier.

B11. The system of B7, wherein the tiered set of rules includes a third match rule, and the third match rule is configured to determine whether metadata, or portions of the metadata, match fields of the record of the search structure.

B12. The system of B11, wherein the operations further include, in response to the third match rule disagreeing with the second match rule, update the source field with a new source identifier.

B13. The system of B7, wherein the search structure includes a mapped index of fields to the known hosts.

B14. The system of B13, wherein the search structure further includes a plurality of indexes.

B15. The system of B13, wherein the search structure further a first index and a second index, the first index maps native identifiers to the known hosts, and the second index maps source identifiers to the known hosts.

B16. The system of B15, wherein the search structure further includes a third index, and the third index maps a subset of the set of fields to known hosts.

B17. The system of B7, wherein the search structure is generated at run-time from data in a database.

B18. The system of any of B1-B17, wherein the operations further include: pre-process the source data into a defined schema.

B19. The system of B18, wherein the operations further include deduplicate multiple findings for the first host, including the first asset finding or the first vulnerability finding and additional findings.

B20. The system of B19, wherein the operations further include, in response to determining the first asset finding or the first vulnerability finding includes partial data, retrieve additional data to supplement matching on the record of the search structure.

B21. The system of any of B1-B20, wherein the operations further include, based on the generated or updated records for the first host, update an asset history for the first host.

B22. A computer-implemented method for host matching in asset and vulnerability management, the computer-implemented method comprising:
obtaining source data from at least one source, wherein the source data includes a plurality of asset findings and/or vulnerability findings;
extracting data bits for each asset finding or vulnerability finding from the source data;
determining a first asset finding or first vulnerability finding concerns a first host based on first data bits for the first asset finding or the first vulnerability finding;
in response to determining the first asset finding or the first vulnerability finding concerns the first host, obtaining a search structure,
  wherein the search structure includes, for each record of a plurality of records of the search structure, known-host values for a set of fields for known hosts;
determining whether the first data bits match a record of the search structure in accordance with a tiered set of rules,
  wherein the tiered set of rules include at least a first match rule and a second match rule,
  the first match rule determines whether a native host identifier of the first data bits match a native host field of the record of the search structure, and
  the second match rule determines whether a source identifier of the first data bits match a source field of the record of the search structure;
based on a match result, generating or updating records for the first host;
based on the generated or updated records for the first host, determining a vulnerability status from a first time period to a second time period; and
causing a management graphical user interface to be displayed to a user, wherein the management graphical user interface displays the vulnerability status from the first time period to the second time period.

B23. A system for host matching in asset and vulnerability management, the system comprising:
at least one memory configured to store instructions; and
at least one processor configured to execute the instructions to perform operations, wherein the operations include:
  obtain source data from at least one source, wherein the source data includes a plurality of vulnerability findings;
  extract data bits for each vulnerability finding from the source data;
  determine a first vulnerability finding concerns a first host based on first data bits for the first vulnerability finding;
  in response to determining the first vulnerability finding concerns the first host, obtain a search structure,
    wherein the search structure includes, for each record of a plurality of records of the search structure, known-host values for a set of fields for known hosts;
  determine whether the first data bits match a record of the search structure in accordance with a tiered set of rules,
    wherein the tiered set of rules include at least a first match rule and a second match rule,
    the first match rule determines whether a native host identifier of the first data bits match a native host field of the record of the search structure, and
    the second match rule determines whether a source identifier of the first data bits match a source field of the record of the search structure;
  based on a match result, generate or update records for the first host;
  based on the generated or updated records for the first host, determine a vulnerability status from a first time period to a second time period; and
  cause a vulnerability management graphical user interface to be displayed to a user, wherein the vulnerability management graphical user interface displays the vulnerability status from the first time period to the second time period.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for container image deduplication in asset and vulnerability management, the system comprising:
at least one memory configured to store instructions; and
at least one processor configured to execute the instructions to perform operations, wherein the operations include:
obtain source data from at least one source, wherein the source data includes a plurality of assets and/or findings;
extract data bits for each asset or finding from the source data;
determine a first asset or finding concerns a first container image based on the data bits for the first asset or finding;
in response to determining the first asset or finding concerns the first container image, obtain a container image dataset,
wherein the container image dataset includes a plurality of sets of values for identification fields,
each of the plurality of sets of values respectively correspond to a container image assets of a plurality of container image assets, and
the identification fields include, at least, a repository identifier field and a hash field;
determine whether the data bits match any of the plurality of sets of values;
based on a match result, generate or update records for the first container image;
based on the generated or updated records for the first container image, determine a vulnerability status from a first time period to a second time period; and
cause a management graphical user interface to be displayed to a user, wherein the management graphical user interface displays the vulnerability status from the first time period to the second time period.

2. The system of claim 1, wherein, to extract the data bits for each asset or finding from the source data, the operations further include: determine a type of source; determine a source model based on the type of source; extract, for each asset or finding, the data bits for the finding using the source model; and map the extracted data bits in a defined format for recall.

3. The system of claim 1, wherein the hash field stores a container image digest or a container image id.

4. The system of claim 3, wherein the container image digest is a hash of a manifest file for the first container image.

5. The system of claim 3, wherein the container image id is a hash of a configuration file for the first container image.

6. The system of claim 1, wherein the hash field is a first hash field, and the identification fields further includes a second hash field.

7. The system of claim 6, wherein the first hash field stores a container image digest, and the second hash field stores a container image id.

8. The system of claim 6, wherein, to determine whether the data bits match any of the plurality of sets of values, the operations further include: determine whether the data bits include a repository identifier value, and at least one of: a first hash value for the first hash field or a second hash value for the second hash field.

9. The system of claim 8, wherein the operations further include, in response to determining the data bits do include the repository identifier value and at least one of the first hash value or the second hash value, determine whether a first match condition is satisfied.

10. The system of claim 9, wherein the first match condition is satisfied when a set of values, of the plurality of sets of values for identification fields, match (a) the repository identifier value and the first hash value, (b) the repository identifier value and the second hash value, or (c) the repository identifier value, the first hash value, and the second hash value.

11. The system of claim 10, wherein, in a case that (a) or (b) is matched, the operations further include: update an asset record for the first container image with an omitted value using the first hash value or the second hash value.

12. The system of claim 10, wherein, in a case that a container image digest value matches but a container image id does not match, the operations further include: overwrite the container image id in an asset record for the first container image.

13. The system of claim 8, wherein the operations further include, in response to determining the data bits (1) do include the repository identifier value and (2) do not include at least one of the first hash value or the second hash value, determine whether a second match condition is satisfied.

14. The system of claim 13, wherein the identification fields further include one or combinations of: a tag field, and/or platform data fields.

15. The system of claim 14, wherein the second match condition is satisfied when a set of values match: (a) the repository identifier value and a tag value for the tag field, or (b) the repository identifier value, the tag value, and platform data value(s) of the platform data fields.

16. The system of claim 15, wherein, in a case that (a) is matched and (b) is not matched, the operations further include: generate a new asset record for the first container image, so that platform variation is tracked as a different asset.

17. A computer-implemented method for container image deduplication in vulnerability detection and management, the computer-implemented method comprising:
obtaining source data from at least one source, wherein the source data includes a plurality of assets and/or findings;
extracting data bits for each asset or finding from the source data;
determining a first asset or finding concerns a first container image based on the data bits for the first asset or finding;
in response to determining the first asset or finding concerns the first container image, obtaining a container image dataset,
wherein the container image dataset includes a plurality of sets of values for identification fields,
each of the plurality of sets of values respectively correspond to a container image assets of a plurality of container image assets, and
the identification fields include, at least, a repository identifier field and a hash field;
determining whether the data bits match any of the plurality of sets of values;
based on a match result, generating or updating records for the first container image;
based on the generated or updated records for the first container image, determining a vulnerability status from a first time period to a second time period; and
causing a management graphical user interface to be displayed to a user, wherein the management graphical user interface displays the vulnerability status from the first time period to the second time period.

18. The computer-implemented method of claim 17, wherein the hash field stores a container image digest or a container image id.

19. The computer-implemented method of claim 18, wherein the container image digest is a hash of a manifest file for the first container image, and the container image id is a hash of a configuration file for the first container image.

20. A system for container image deduplication in vulnerability detection and management, the system comprising:
- at least one memory configured to store instructions; and
- at least one processor configured to execute the instructions to perform operations, wherein the operations include:
  - obtain scanner data from at least one scanner, wherein the scanner data includes a plurality of findings;
  - extract data bits for each finding from the scanner data;
  - determine a first finding concerns a first container image based on the data bits for the first finding;
  - in response to determining the first finding concerns the first container image, obtain a container image dataset,
    - wherein the container image dataset includes a plurality of sets of values for identification fields,
    - each of the plurality of sets of values respectively correspond to a container image assets of a plurality of container image assets, and
    - the identification fields include, at least, a repository identifier field and a hash field;
  - determine whether the data bits match any of the plurality of sets of values;
  - based on a match result, generate or update records for the first container image;
  - based on the generated or updated records for the first container image, determine a vulnerability status from a first time period to a second time period; and
  - cause a vulnerability management graphical user interface to be displayed to a user, wherein the vulnerability management graphical user interface displays the vulnerability status from the first time period to the second time period.

* * * * *